US011798556B2

(12) United States Patent
Mutagi et al.

(10) Patent No.: US 11,798,556 B2
(45) **Date of Patent: *Oct. 24, 2023**

(54) CONFIGURABLE OUTPUT DATA FORMATS

(71) Applicant: Amazon Technologies, Inc., Seattle, WA (US)

(72) Inventors: Rohan Mutagi, Redmond, WA (US); Felix Wu, Seattle, WA (US); Rongzhou Shen, Bothell, WA (US); Neelam Satish Agrawal, Mountlake Terrace, WA (US); Vibhunandan Gavini, Mercer Island, WA (US); Pablo Carballude Gonzalez, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/575,699

(22) Filed: Jan. 14, 2022

(65) Prior Publication Data

US 2022/0139395 A1 May 5, 2022

Related U.S. Application Data

(63) Continuation of application No. 16/569,780, filed on Sep. 13, 2019, now Pat. No. 11,257,495, which is a (Continued)

(51) Int. Cl.

| | |
|---|---|
| ***G10L 15/22*** | (2006.01) |
| ***G10L 15/30*** | (2013.01) |
| ***G10L 17/22*** | (2013.01) |
| ***G10L 15/18*** | (2013.01) |
| ***G10L 13/08*** | (2013.01) |
| ***G06F 3/16*** | (2006.01) |
| ***G06F 16/00*** | (2019.01) |

(Continued)

(52) U.S. Cl.

CPC .............. *G10L 15/22* (2013.01); *G06F 3/167* (2013.01); *G06F 16/00* (2019.01); *G10L 13/08* (2013.01); *G10L 15/1815* (2013.01); *G10L 15/30* (2013.01); *G10L 17/22* (2013.01); *G10L 13/00* (2013.01); *G10L 15/00* (2013.01); *G10L 2015/223* (2013.01)

(58) Field of Classification Search

CPC ..... G10L 15/22; G10L 13/08; G10L 15/1815; G10L 15/30; G10L 17/22; G10L 13/00; G10L 15/00; G10L 2015/223; G06F 3/167; G06F 16/00; G06F 16/635

See application file for complete search history.

(56) References Cited

U.S. PATENT DOCUMENTS 10,418,033 B1 * 9/2019 Mutagi .................. G10L 17/22
11,257,495 B2 * 2/2022 Mutagi .................. G10L 17/22

(Continued)

*Primary Examiner* — Abul K Azad

(74) *Attorney, Agent, or Firm* — PIERCE ATWOOD LLP

(57) ABSTRACT

Configurable core domains of a speech processing system are described. A core domain output data format for a given command is originally configured with default content portions. When a user indicates additional content should be output for the command, the speech processing system creates a new output data format for the core domain. The new output data format is user specific and includes both default content portions as well as user preferred content portions.

18 Claims, 15 Drawing Sheets

Related U.S. Application Data continuation of application No. 15/611,228, filed on Jun. 1, 2017, now Pat. No. 10,418,033.

(51) Int. Cl.
*G10L 13/00* (2006.01)
*G10L 15/00* (2013.01)

(56) References Cited

U.S. PATENT DOCUMENTS

2004/0044516 A1* 3/2004 Kennewick ......... G10L 15/1822
704/E15.04
2007/0033005 A1* 2/2007 Cristo ..................... G10L 15/19
704/9

* cited by examiner

FIG. 5A

In [geographic location of device], today's weather is a high of [high temperature for geographic location] and a low of [low temperature for geographic location].

FIG. 5B

In [geographic location of device], today's weather is a high of [high temperature for geographic location] and a low of [low temperature for geographic location], with an air quality index of [air quality index for geographic location], and an average wind speed of [wind speed for geographic location].

FIG. 8

| **User Command** | **Domain 1** | **Domain 2** |
|---|---|---|
| "what is the weather" | <intent: weatherrequest>; <slot: [user location]> | <intent: weatherrequest>; <slot: windspeed>; <context> |
| "how do I boil pasta" | <intent: reciperequest>; <slot: pasta> | <intent: reciperequest>; <slot: pasta>; <slot: altitude> |
| "what does a police siren sound like" | <intent: request>; <slot: police siren sound> | <intent: request>; <slot: police siren sound>; <slot: geographic location> |

CONFIGURABLE OUTPUT DATA FORMATS

CROSS REFERENCE TO RELATED APPLICATION

This application is a continuation of, and claims the benefit of priority of, U.S. Non-Provisional patent application Ser. No. 16/569,780, filed Sep. 13, 2019 and titled "CONFIGURABLE OUTPUT DATA FORMATS", which is a continuation of U.S. Non-Provisional patent application Ser. No. 15/611,228, filed Jun. 1, 2017 and titled "CONFIGURABLE OUTPUT DATA FORMATS", issued as U.S. Pat. No. 10,418,003. The contents of the above are hereby expressly incorporated herein by reference in their entireties.

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is referred to herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 5A illustrates a default weather core domain output data format according to embodiments of the present disclosure.

FIG. 5B illustrates an altered weather core domain output data format according to embodiments of the present disclosure.

FIG. 8 illustrates an output data format associated with domain specific slot data according to embodiments of the present disclosure.

DETAILED DESCRIPTION

Figure 1:
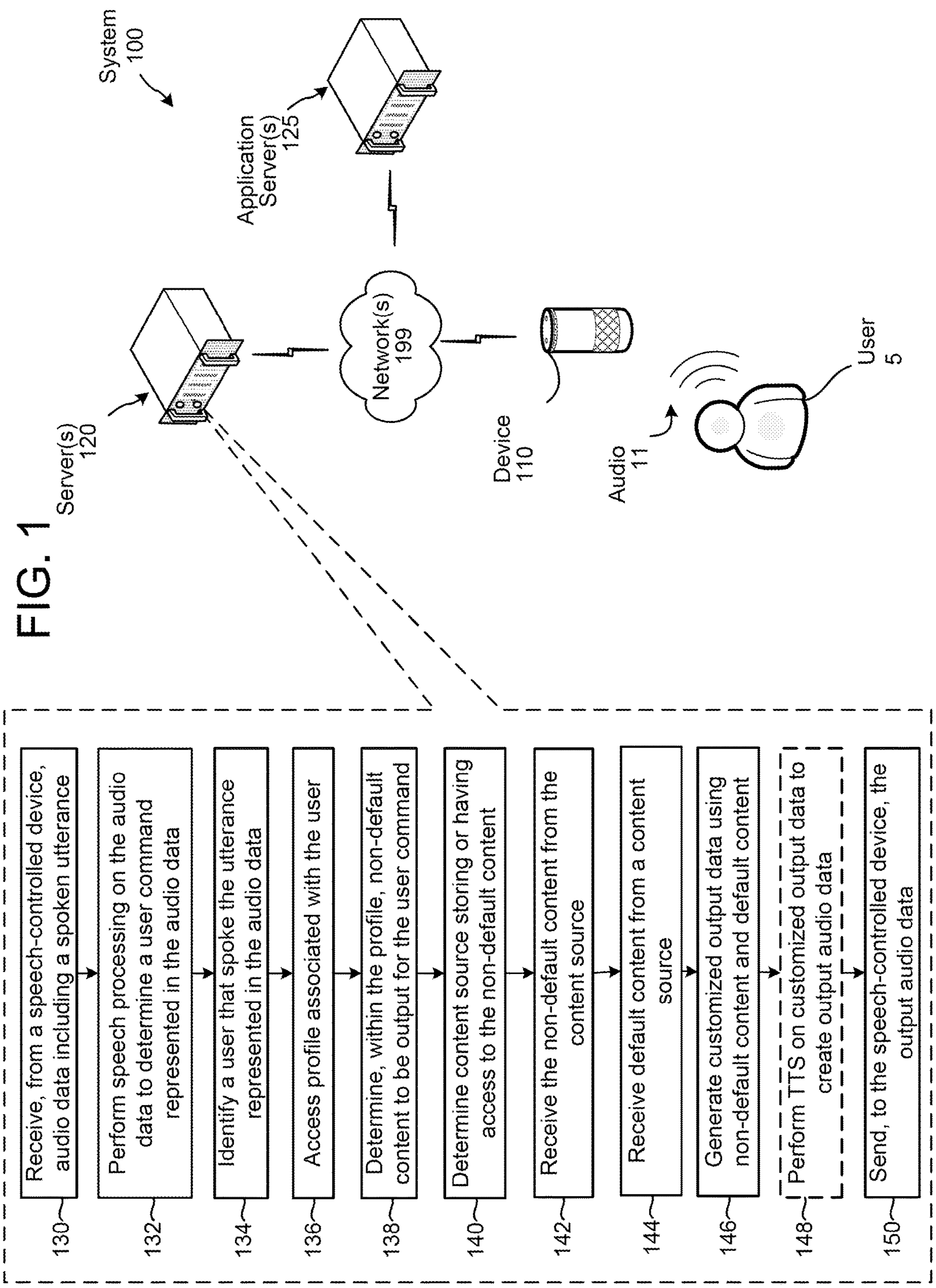
FIG. 1 illustrates a speech processing system that configures core domain output data formats based on user preferences according to embodiments of the present disclosure.

Automatic speech recognition (ASR) is a field of computer science, artificial intelligence, and linguistics concerned with transforming audio data associated with speech into text data representative of that speech. Similarly, natural language understanding (NLU) is a field of computer science, artificial intelligence, and linguistics concerned with enabling computers to derive meaning from text input containing natural language. Likewise, text-to-speech (TTS) is a field of computer science, artificial intelligence, and linguistics concerned with enabling computers to output synthesized speech. ASR, NLU, and TTS may be used together as part of a speech processing system.

A speech processing system may be configured to execute one or more commands corresponding to input speech. The speech processing system may be capable of implementing commands in a variety of subject areas (also referred to as domains) such as weather, shopping, music, videos, etc. for which a user may request content. For example, a user may say "what's the weather," and the speech processing system may respond with the current temperature of a location of the user, as determined based on a location of a user device that captured the user's utterance.

Certain domains may be controlled by the same company or entity that operates the ASR, NLU or other operations. Such domains may be referred to as core domains. Other domains may be operated by third parties and may expand the capabilities of the speech processing beyond the core domain functionality offered by the speech processing system. Domain, as used herein, may refer to a category of content, such as music, videos, weather, etc. For example, a pizza delivery store may provide information that the speech processing system can use to analyze incoming requests for pizza delivery from the particular pizza delivery store. An incoming utterance may thus be processed using ASR and NLU to obtain data that can be sent to the pizza delivery store to ultimately cause a pizza (or other order) to be delivered to the appropriate user. Similarly, a third party music service may be configured to operate with the system so that a user can request music from the third party music service, the system can understand the request is for that service and can pass a request to the service, and the service can work with the system to output music to the requesting user's device. Such additional domains may be referred to as add-on or third party domains. While core domains may be active for a particular user by default, add-on domains may need to be authorized by a user in order to be used to process a request from the user.

Each core domain may be configured to output default content in response to a spoken utterance. For example, under default conditions, a request for weather information from a weather core domain may result in the weather domain outputting information about the temperature.

In various situations, a user may desire to know additional content other than the default content for a particular domain. For example, while the weather core domain is configured to output the temperature in response to every input request, a user may desire to also know the windspeed and the air quality of the user's location. In such situations, the user may separately have to ask the system "what is the weather," "what is the air quality index," and "what's the wind speed." Alternatively, if the desired information is unavailable from a core domain, the user may have to form a request directed to an add-on domain to obtain the required information. For example, a user may have to create an utterance such as "ask Pilot Assistant what's the wind speed today" to obtain wind-speed information. Requiring the user to speak multiple utterances to the system may be undesirable because it provides a segmented user experience that is time consuming in terms of speaking the utterances as well as receiving the content.

The present disclosure allows for a more streamlined user experience by configuring core domains of a speech processing system with configurable content portions (e.g., plugins or slots) that may relate to other information from core domains or information from add-on domains. Such configurable portions enable a user to customize content output by a domain. For example, a default output data format for a weather core domain may be configured to simply output the temperature to a user. The system, based on user preferences, may add portions to the default output data format for the weather core domain that cause the system to output the temperature as well as air quality index and wind speed whenever the user asks the system "what's the weather," or the like. If the air quality index and/or wind speed are unavailable to the weather core domain, the system may be configured to obtain that information from an alternate service, such as an application server or other data store associated with an add-on domain. The user may configure the system to include desired add-on domains for a given utterance by selecting such from a list of add-on domains. For example, a user may login to a user profile, and configure which domains (i.e., core and/or add-on) that are invoked by a given user command.

The system may then create customized output data that includes certain data from one domain (e.g., the temperature information from the core weather domain) and certain data from another domain (e.g., the air quality index and wind speed information from the Pilot Assistant domain). The system may also be configured to store the user's preferences with regard to the customized output data such that if the user repeats the request that should be customized (e.g., "what's the weather") the system will recognize that the request calls for customized output data and will obtain the data from the multiple domains for eventual return to the user (for example, by performing TTS on the customized output data to create a speech output that will be sent to the user's device).

As noted above, the speech processing system may be configured to receive content pertaining to the configurable portions from one or more third party content sources (e.g., add-on domains or other sources not controlled or maintained by the speech processing system). For example, if the speech processing system does not store air quality index information and/or wind speed information, the speech processing system may link the provider of such information (e.g., the Pilot Assistant source) to a weather request made by the particular user. The teachings of the present disclosure provide a smooth user experience that allows a user to obtain all desired content related to a request to a certain domain (even if the desired content is obtained from another domain) by simply speaking a single utterance or issuing a single command.

FIG. 1 shows a speech processing system 100 capable of configuring domain frameworks according to user preferences as described herein. Although the figures and discussion illustrate certain operational steps of the system 100 in a particular order, the steps described may be performed in a different order (as well as certain steps removed or added) without departing from the intent of the disclosure. As shown in FIG. 1, the system 100 may include one or more speech-controlled devices 110 local to a user 5, as well as one or more networks 199 and one or more servers 120 connected to the speech-controlled device(s) 110 across the network(s) 199. The server(s) 120 (which may be one or more different physical devices) may be capable of performing traditional speech processing (e.g., ASR, NLU, command processing, etc.) as well as other operations as described herein. A single server 120 may perform all speech processing or multiple servers 120 may combine to perform all speech processing. Further, the server(s) 120 may execute certain commands, such as answering spoken utterances of users 5 and operating other devices (e.g., light switches, appliances, etc.). In addition, certain speech detection or command execution functions may be performed by the speech-controlled device 110. Further, the system 100 may be in communication with external data sources, such as a knowledge base, external service provider devices (e.g., application servers 125), or the like.

As shown in FIG. 1, a speech-controlled device 110 may capture audio 11 including a spoken utterance of a user 5 via one or more microphones of the speech-controlled device 110. The speech-controlled device 110 determines audio data corresponding to the captured audio 11, and sends the audio data to the server(s) 120 for processing.

The server(s) 120 receives (130) the audio data from the speech-controlled device 110. The server(s) 120 performs (132) speech processing on the audio data to determine a user command represented in the audio data. This may include performing ASR on the input audio data to obtain text data as well as performing NLU operations on the text data to identify an intent corresponding to the text data.

The server(s) 120 also identifies (134) a user that spoke the utterance represented in the audio data. User recognition may involve determining audio characteristics of the spoken utterance, and comparing such to stored audio characteristics of users of the speech-controlled device 110 from which the audio data was received by the server(s) 120. Other data described herein may also be used to recognize the user that spoke the utterance as described below with regard to user recognition component 295.

The server(s) 120 may access (136) a profile associated with the user, and therein determine (138) non-default content to be output for the user command. This may include customized content that the user has previously indicated should be output in response to the particular spoken utterance. The profile may include data corresponding to user commands executable by the system 100. The data corresponding to a given user command may be associated with data indicating non-default, user indicated content to be output in addition to default content for the user command. Thus, it should be appreciated that the profile may include data specific to user commands wherein non-default content should be output. The profile need not include data pertaining to every user command executable by the system 100.

The server(s) 120 may then determine (140) a content source storing or having access to the non-default content. The content source may be indicated by the user. For example, if the non-default content is weather related, the user may indicate which weather service the user desires the non-default content to originate from. Alternatively, the content source may be determined without user indication. The content source may be a first party (1P) application (such as a core domain controlled or managed by the server(s) 120). Alternatively, the content source may be a third party (3P) application (such as an add-on domain, e.g., a "skill," managed by an application server(s) 125 in communication with the server(s) 120 but not controlled or managed by the server(s) 120).

A "skill" may correspond to a domain and may be software running on a server or device akin to an application. That is, a skill may enable a server(s) 120/125 to execute specific functionality in order to provide data or produce some other output called for by a user. The system may be configured with more than one skill. For example a weather service skill may enable the server(s) 120 to execute a command with respect to a weather service server 125, a car service skill may enable the server(s) 120 to execute a command with respect to a taxi service server 125, an order pizza skill may enable the server(s) 120 to execute a command with respect to a restaurant server 125, etc.

The server receives (142) the non-default content from the determined content source, as well as receives (144) default content to be output for the user command from a content source(s). As with the content source of the non-default content, the content source of the default content may be a 1P application or a 3P application. The server(s) 120 may then generate (146) customized output data using the non-default content and default content, for example by combining the non-default content and default content into the customized output data.

In an example, both the default and non-default content may be received as text data from the content source(s). In such an example, the server(s) 120 may perform (148) TTS on the customized output data to generate output audio data. In another example, both the default and non-default content may be received as audio data from the content source(s). In this example, the server(s) 120 may concatenate the received portions of audio data to generate the output audio data. In a further example, one of the default and non-default content may be received as audio data while the other content is received as text data. In this example, the server(s) 120 may perform TTS on the received text data to generate audio data, and thereafter concatenate the received audio data with the generated audio data to generated the output audio data.

The server(s) 120 sends (150) the output audio data to the speech-controlled device 110 (or another device indicated in the profile of the user 5). The speech-controlled device 110 (or other device) outputs audio corresponding to the output audio data to the user 5.

As described, the server(s) 120 may compile the default and non-default content, transform such into outputtable data, and then send such data to the speech-controlled device 110 for output to the user 5. It should also be appreciated that the content source may send the default and/or non-default content directly to the speech-controlled device 110. Such a situation may occur if both the default and non-default content are stored or accessed by the same content source.

As also described above, the server(s) 120 receives (130) audio data from the speech-controlled device 110 and performs (132) speech processing on the audio data to determine the user command. Such speech processing may include performing ASR on the audio data to generate text data, and performing NLU on the text data to determine the user command. It should thus also be appreciated that, rather than determine the user command from received audio data, the server(s) 120 may determine the user command from received text data. For example, a user may type text into an application executed by a computing device such as a smart phone, tablet, or the like. The computing device may generate text data from the input text, and send the text data to the server(s) 120. The server(s) 120 may then perform NLU on the received text data to determine the user command.

Figure 2:
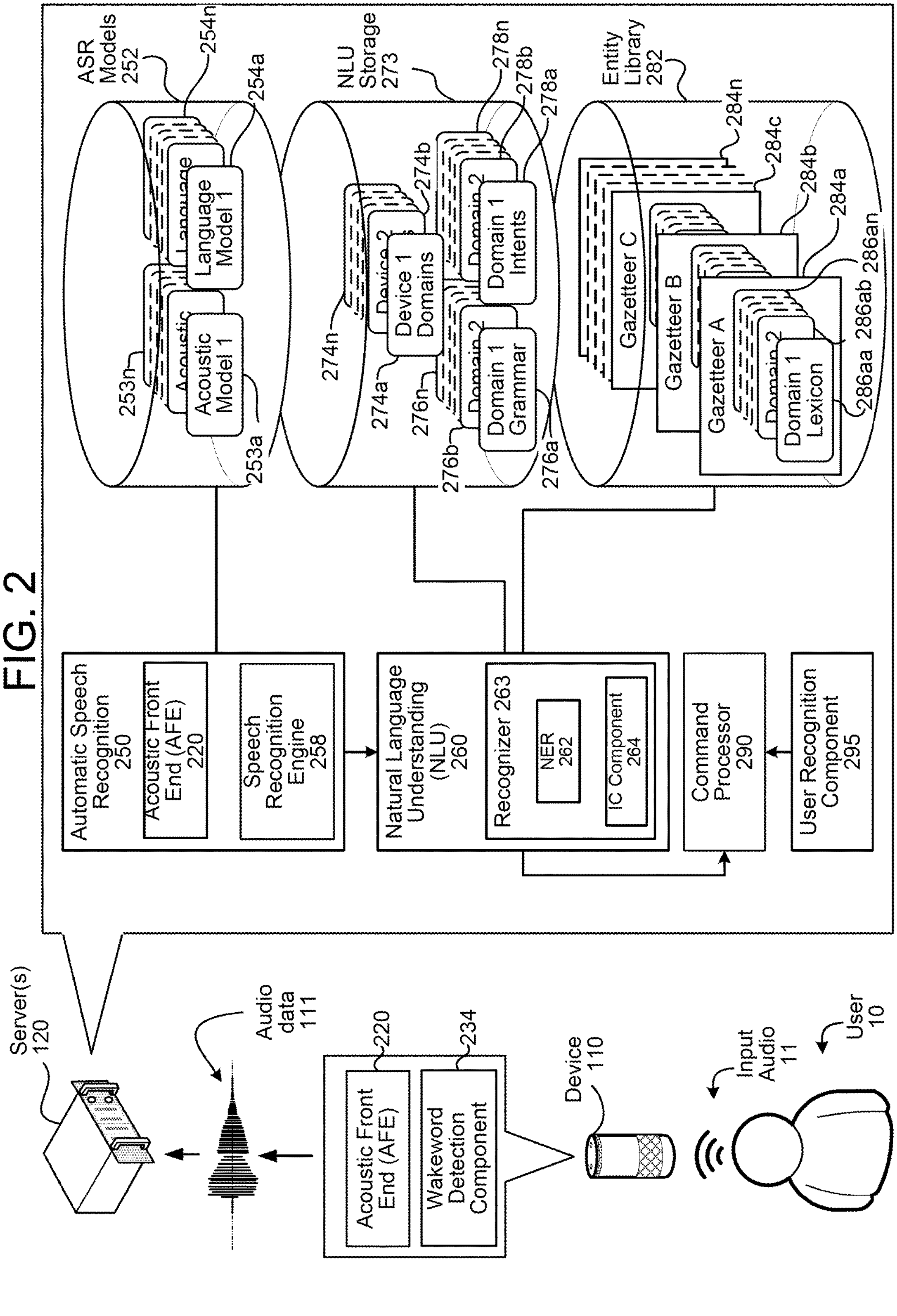
FIG. 2 is a diagram of components of a speech processing system according to embodiments of the present disclosure.

The system 100 of FIG. 1 may operate using various speech processing components as described in FIG. 2. FIG. 2 is a conceptual diagram of how a spoken utterance is processed. The various components illustrated may be located on a same or different physical devices. Communication between various components illustrated in FIG. 2 may occur directly or across a network(s) 199. An audio capture component, such as a microphone of the device 110 (or other device), captures input audio 11 corresponding to a spoken utterance. The device 110, using a wakeword detection component 234, then processes the audio, or audio data corresponding to the audio (such as feature vectors), to determine if a keyword (such as a wakeword) is detected in the audio. Following detection of a wakeword, the device 110 sends audio data 111, corresponding to the utterance, to a server(s) 120 that includes an ASR component 250. The audio data 111 may be output from an acoustic front end (AFE) 220 located on the device 110 prior to transmission. Alternatively, the audio data 111 may be in a different form for processing by a remote AFE 220, such as the AFE 220 located with the ASR component 250.

Upon receipt by the server(s) 120, an ASR component 250 may convert the audio data 111 into text data. The ASR component 250 transcribes the audio data 111 into text data representing words of speech contained in the audio data 111. The text data may then be used by other components for various purposes, such as executing system commands, inputting data, etc. A spoken utterance in the audio data 111 is input to a processor configured to perform ASR, which then interprets the spoken utterance based on a similarity between the spoken utterance and pre-established language models 254 stored in an ASR model knowledge base (i.e., ASR model storage 252). For example, the ASR component 250 may compare the audio data 111 with models for sounds (e.g., subword units or phonemes) and sequences of sounds to identify words that match the sequence of sounds spoken in the spoken utterance of the audio data 111.

The different ways a spoken utterance may be interpreted (i.e., the different hypotheses) may each be assigned a probability or a confidence score representing a likelihood that a particular set of words matches those spoken in the spoken utterance. The confidence score may be based on a number of factors including, for example, a similarity of the sound in the spoken utterance to models for language sounds (e.g., an acoustic model 253 stored in the ASR model storage 252), and a likelihood that a particular word that matches the sound would be included in the sentence at the specific location (e.g., using a language model 254 stored in the ASR model storage 252). Thus, each potential textual interpretation of the spoken utterance (i.e., hypothesis) is associated with a confidence score. Based on the considered factors and the assigned confidence score, the ASR component 250 outputs text data representing the most likely text recognized in the audio data 111. The ASR component 250 may also output multiple hypotheses in the form of a lattice or an N-best list with each hypothesis corresponding to a confidence score or other score (e.g., such as probability scores, etc.).

The device(s) including the ASR component 250 may include an AFE 220 and a speech recognition engine 258. The AFE 220 may transform raw audio data, captured by the microphone of the device 110, into audio data for processing by the speech recognition engine 258. The speech recognition engine 258 compares the transformed, speech recognition audio data with acoustic models 253, language models 254, and other data models and information for recognizing the speech conveyed in the audio data 111.

The speech recognition engine 258 may process data output from the AFE 220 with reference to information stored in the ASR model storage 252. Alternatively, post front-end processed data (e.g., feature vectors) may be received by the device(s) executing ASR processing from another source besides the internal AFE 220. For example, the device 110 may process audio data 111 into feature vectors (e.g., using an on-device AFE 220) and transmit that information to the server(s) 120 across the network(s) 199 for ASR processing. Feature vectors may arrive at the server(s) 120 encoded, in which case they may be decoded prior to processing by the processor executing the speech recognition engine 258.

The speech recognition engine 258 attempts to match received feature vectors to language phonemes and words as known in the stored acoustic models 253 and language models 254. The speech recognition engine 258 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving a likelihood that the ASR component 250 will output text data that makes sense grammatically.

The speech recognition engine 258 may use a number of techniques to match feature vectors to phonemes, for example using Hidden Markov Models (HMIs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 258 to other processing components, which may be local to the device(s) performing ASR and/or distributed across the network(s) 199. For example, ASR results in the form of a single textual representation of the speech, an N-best list including multiple hypotheses and respective scores, lattice, etc. may be sent to a server, such as the server(s) 120, for natural language understanding (NLU) processing, such as conversion of the text data into commands for execution, either by the device 110, by the server(s) 120, or by another device (e.g., a server running a search engine, etc.)

The device(s) performing NLU processing (e.g., the server(s) 120) may include various components, including potentially dedicated processor(s), memory, storage, etc. As shown in FIG. 2, a NLU component 260 may include a recognizer 263 that includes a named entity recognition (NER) component 262 which is used to identify portions of text data that correspond to a named entity that may be recognizable by the system. A downstream process called named entity resolution actually links a text portion to an actual specific entity known to the system. To perform named entity resolution, the system may utilize gazetteer information 284 stored in an entity library storage 282. The gazetteer information 284 may be used for entity resolution, for example matching ASR results (i.e., text data) with different entities (such as song titles, contact names, etc.). Gazetteers 284 may be linked to users (for example a particular gazetteer 284 may be associated with a specific user's music collection), may be linked to certain domains (such as shopping), or may be organized in a variety of other ways. The NER component 262 (or other component) may also determine whether a word refers to an entity that is not explicitly mentioned in the utterance text, for example "him," "her," "it" or other anaphora, exophora or the like.

Generally, the NLU component 260 takes text data and attempts to make a semantic interpretation of the text represented therein. That is, the NLU component 260 determines the meaning behind the text based on the individual words and then implements that meaning. NLU processing interprets a text string to derive an intent or a desired action from the user as well as the pertinent pieces of information in the text that allow a device (e.g., the device 110) to complete that action. For example, if the ASR component 250 processes a spoken utterance and outputs text data including the text "call mom," the NLU component 260 may determine that the user intended to activate a telephone in his/her device and to initiate a call with a contact matching the entity "mom" (which may involve a downstream command processor 290 linked with a telephone application).

The NLU component 260 may process several textual inputs related to the same utterance. For example, if the ASR component 250 outputs N text segments (as part of an N-best list), the NLU component 260 may process all N outputs to obtain NLU results.

The NLU component 260 may be configured to parse and tag to annotate text as part of NLU processing. For example, for the text "call mom," "call" may be tagged as a command (to execute a phone call) and "mom" may be tagged as a specific entity and target of the command. Moreover, the telephone number for the entity corresponding to "mom" stored in a contact list may be included in the annotated text. Further, the NLU component 260 may be used to provide answer data in response to queries, for example using a NLU knowledge base 273.

To correctly perform NLU processing, the NLU component 260 may be configured to determine a "domain" of the utterance so as to determine and narrow down which services offered by an endpoint device (e.g., the server(s) 120 or the device 110) may be relevant. For example, an endpoint device may offer services relating to interactions with a telephone service, a contact list service, a calendar/scheduling service, a music player service, etc. Words in a single portion of text data input into the NLU component 260 may implicate more than one service, and some services may be functionally linked (e.g., both a telephone service and a calendar service may utilize data from the contact list).

The NER component 262 receives text data and attempts to identify relevant grammars and lexical information that may be used to construe meaning. To do so, the NLU component 260 may begin by identifying potential domains that may relate to the received text data. The NLU storage 273 includes a database of device domains (274*a*-274*n*) identifying domains associated with specific devices. For example, the device 110 may be associated with domains for music, telephony, calendaring, contact lists, and device-specific communications. In addition, the entity library 282 may include database entries about specific services on a specific device, either indexed by Device ID, Speaker ID, Household ID, or some other indicator.

In NLU processing, a domain may represent a discrete set of activities having a common theme, such as "shopping," "music," "calendaring," etc. As such, each domain may be associated with a particular recognizer 263, language model and/or grammar database (276*a*-276*n*), a particular set of intents/actions (278*a*-278*n*), and a particular personalized lexicon (286). Each gazetteer (284*a*-284*n*) may include domain-indexed lexical information associated with a particular user and/or device. For example, the Gazetteer A (284*a*) includes domain-index lexical information 286*aa* to 286*an*. A user's music-domain lexical information may include album titles, artist names, and song names, for example, whereas a user's contact-list lexical information may include the names of contacts. Since every user's music collection and contact list is presumably different, this personalized information improves entity resolution.

In traditional NLU processing, text data may be processed applying the rules, models, and information applicable to each identified domain. For example, if text data potentially implicates both communications and music, the text data may, substantially in parallel, be NLU processed using the grammar models and lexical information for communications, and processed using the grammar models and lexical information for music. The responses based on the text data produced by each set of models is scored (discussed further below), with the overall highest ranked result from all applied domains being ordinarily selected to be the correct result.

An intent classification (IC) component 264 parses the text data to determine an intent(s) for each identified domain, where the intent corresponds to the action to be performed that is responsive to the spoken utterance represented in the text data. Each domain is associated with a database (278*a*-278*n*) of words linked to intents. For example, a music intent database may link words and phrases such as "quiet," "volume off," and "mute" to a "mute" intent. The IC component 264 identifies potential intents for each identified domain by comparing words in the text data to the words and phrases in the intents database 278. The determination of an intent by the IC component 264 may be performed using a set of rules or templates that are processed against the incoming text data to identify a matching intent.

In order to generate a particular interpreted response, the NER component 262 applies the grammar models and lexical information associated with the respective domain to recognize a mention of one or more entities in the text of the text data. In this manner, the NER component 262 identifies words corresponding to "slots" (i.e., particular words in text data that may be used to fill various data fields used to execute commands) that may be needed for later command processing. Depending on the complexity of the NER component 262, the NER component 262 may also label each slot with a type of varying levels of specificity (such as noun, place, city, artist name, song name, or the like). Each grammar model 276 includes the names of entities (i.e., nouns) commonly found in speech about the particular domain (i.e., generic terms). For example, a grammar model associated with the shopping domain may include a database of words commonly used when people discuss shopping. In contrast, the lexical information 286 from the gazetteer 284 is personalized to the user(s) and/or the device.

The intents identified by the IC component 264 are linked to domain-specific grammar frameworks (included in 276) with "slots" or data fields to be filled. Each slot/data field corresponds to a portion of the text data that the system believes corresponds to an entity. For example, if "play music" is an identified intent, a grammar framework(s) 276 may correspond to sentence structures such as "Play {Artist Name}," "Play {Album Name}," "Play {Song name}," "Play {Song name} by {Artist Name}," etc. However, to make resolution more flexible, these frameworks may not be structured as sentences, but rather based on associating slots with grammatical tags.

For example, the NER component 262 may parse the text data to identify words as subject, object, verb, preposition, etc., based on grammar rules and/or models, prior to recognizing named entities. The identified verb may be used by the IC component 264 to identify intent, which is then used by the NER component 262 to identify frameworks. A framework for an intent of "play" may specify a list of slots/fields applicable to play the identified "object" and any object modifier (e.g., a prepositional phrase), such as {Artist Name}, {Album Name}, {Song name}, etc. The NER component 262 then searches the corresponding fields in the domain-specific and personalized lexicon(s), attempting to match words and phrases in the text data tagged as a grammatical object or object modifier with those identified in the database(s).

This process includes semantic tagging, which is the labeling of a word or combination of words according to their type/semantic meaning. Parsing may be performed using heuristic grammar rules, or the NER component 262 may be constructed using techniques such as HMMs, maximum entropy models, log linear models, conditional random fields (CRF), and the like.

For instance, text data corresponding to "play mother's little helper by the rolling stones" may be parsed and tagged as {Verb}: "Play," {Object}: "mother's little helper," {Object Preposition}: "by," and {Object Modifier}: "the rolling stones." At this point in the process, "Play" is identified as a verb based on a word database associated with the music domain, which the IC component 264 will determine corresponds to the "play music" intent. At this stage, no determination has been made as to the meaning of "mother's little helper" and "the rolling stones," but based on grammar rules and models, it is determined that the text of these phrases relate to the grammatical object (i.e., entity) of the text data.

The frameworks linked to the intent are then used to determine what database fields should be searched to determine the meaning of these phrases, such as searching a user's gazetteer for similarity with the framework slots. So a framework for "play music intent" might indicate to attempt to resolve the identified object based on {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer does not resolve the slot/field using gazetteer information, the NER component 262 may search a database of generic words associated with the domain (in the knowledge base 273). So for instance, if the text data corresponded to "play songs by the rolling stones," after failing to determine an album name or song name called "songs" by "the rolling stones," the NER component 262 may search the domain vocabulary for the word "songs." In the alternative, generic words may be checked before the gazetteer information, or both may be tried, potentially producing two different results.

The results of NLU processing may be tagged to attribute meaning to the text data. So, for instance, "play mother's little helper by the rolling stones" might produce a result of: {domain} Music, {intent} Play Music, {artist name} "rolling stones," {media type} SONG, and {song title} "mother's little helper." As another example, "play songs by the rolling stones" might produce: {domain} Music, {intent} Play Music, {artist name} "rolling stones," and {media type} SONG.

Data output from the NLU processing (which may include tagged text data, commands, etc.) may then be sent to a command processor 290, which may be located on a same or separate server 120 as part of system 100. The system 100 may include more than one command processor 290, and the destination command processor 290 may be determined based on the NLU output data. For example, if the NLU output data includes a command to play music, the destination command processor 290 may be a music playing application, such as one located on the device 110 or in a music playing appliance, configured to execute a music playing command. If the NLU output data includes a search utterance (e.g., requesting the return of search results), the command processor 290 selected may include a search engine processor, such as one located on a search server, configured to execute a search command and determine search results, which may include output text data to be processed by a TTS engine and output from a device as synthesized speech.

If the NLU output data includes a command to obtain content from another source, the command processor 290 or other component, through an application program interface (API), may send a request for such content to an appropriate application server 125 or other device. The application server 125 may send the content, for example audio data, to the command processor 290 or other component. In certain instances, the output content sent from the application server 125 may include a link that may be sent from the server(s) 120 to the device 110 so that the device 110 may use the link to access the output content desired by the user. In this case, the output content data may be sent from the application server 125 through the server(s) 120 to the device 110 or directly from the application server 125 to the device 110 (or some other destination appropriate to the command). In certain instances, the output content data may be audio data (such as music, a prerecorded reading of an audio book, etc.) and thus may be output through a speaker of the device 110. In other instances, the output content data may be text data (either generated by the application server 125 or by a component of the server(s) 120) that needs to be converted into audio data prior to being output to a user by the device 110.

Various machine learning techniques may be used to train and operate models to perform various steps described above, such as ASR functions, NLU functions, etc. Such machine learning techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply machine learning techniques, machine learning processes themselves need to be trained. Training a machine learning component requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

The server(s) 120 may further include a user recognition component 295. The user recognition component 295 may be configured to perform user authentication as well as user verification. The user recognition component 295 may authenticate and verify a user using image data captured by a user device, biometric data (e.g., fingerprint data), previously stored audio data containing speech of a user, etc. For example, the user recognition component 295 may authenticate and/or verify a user by comparing speech characteristics in the received audio data 111 to speech characteristics of user stored in a profile of the device 110.

Figure 3:
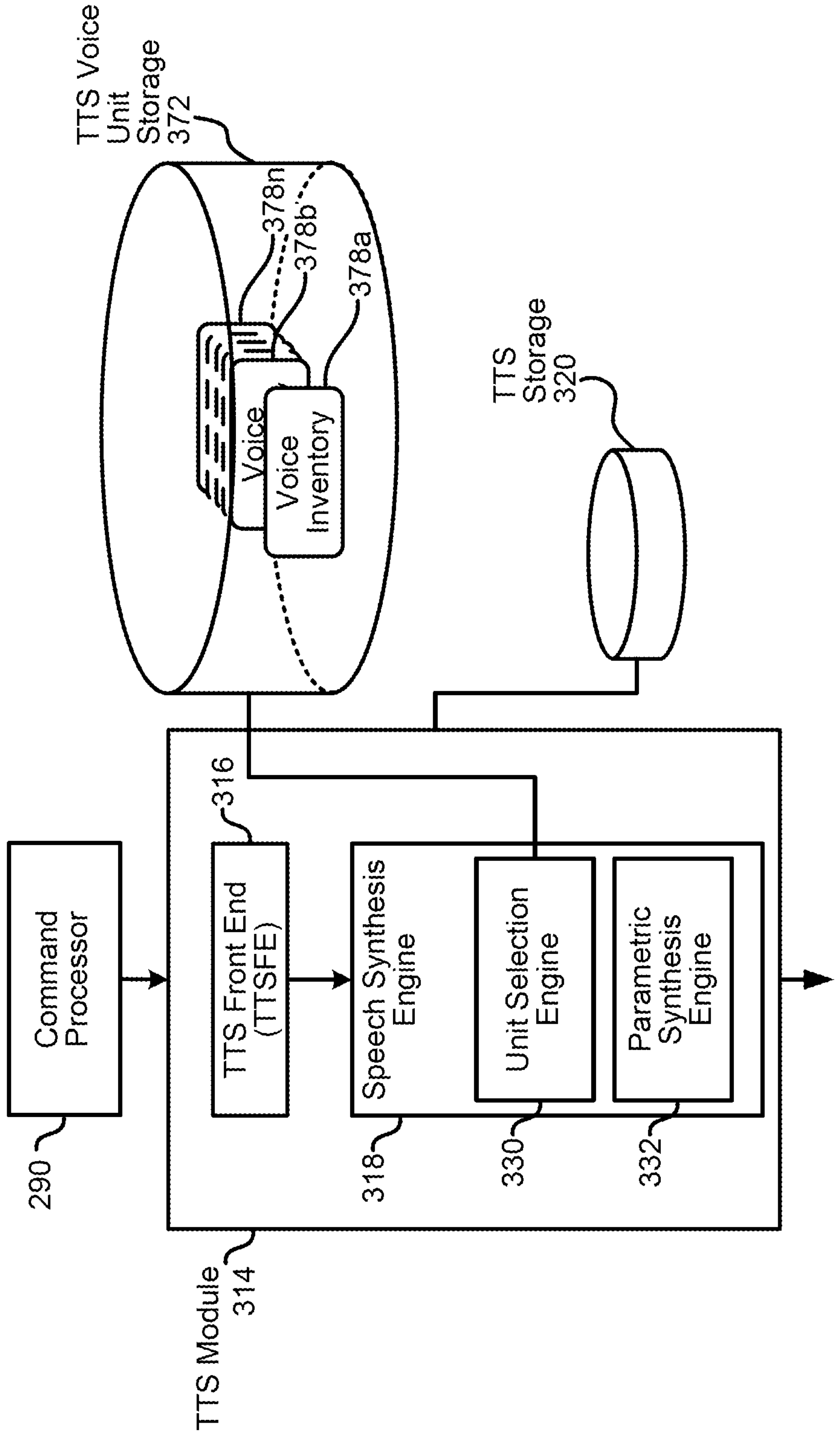
FIG. 3 is a conceptual diagram of how text-to-speech processing is performed according to embodiments of the present disclosure.

To convert text data into output audio data including speech, the system 100 may use a text-to-speech (TTS) component 314 illustrated in FIG. 3. The TTS component 314 may receive text data (from the command processor 290, application server(s) 125, or other component) so the TTS component 314 may synthesize speech corresponding to the text data. Speech may be synthesized by the TTS component 314 as described below with respect to FIG. 3.

The TTS component 314 includes a TTS front end (TTSFE) 316, a speech synthesis engine 318, and a TTS storage 320. The TTSFE 316 transforms input text data (e.g., from the command processor 290) into a symbolic linguistic representation for processing by the speech synthesis engine 318. The TTSFE 316 may also process tags or other data input to the TTS component 314 that indicate how specific words should be pronounced. The speech synthesis engine 318 compares the annotated phonetic units and information stored in the TTS storage 320 for converting the input text data into speech (i.e., audio data). The TTSFE 316 and the speech synthesis engine 318 may include their own controller(s)/processor(s) and memory, or they may use the controller/processor and memory of the server(s) 120, the speech-controlled device 110, or another device, for example. Similarly, the instructions for operating the TTSFE 316 and the speech synthesis engine 318 may be located within the TTS component 314, within the memory and/or storage of the server(s) 120, the speech-controlled device 110, or within an external device.

Text data input into the TTS component 314 may be sent to the TTSFE 316 for processing. The TTSFE 316 may include modules for performing text normalization, linguistic analysis, and linguistic prosody generation. During text normalization, the TTSFE 316 processes the input text data and generates standard/normalized text data, converting such things as numbers, abbreviations (e.g., Apt., St., etc.), and symbols ($, %, etc.) into the equivalent of written out words.

During linguistic analysis the TTSFE 316 analyzes language in the normalized text data to generate a sequence of phonetic units corresponding to the text data. This process may be referred to as phonetic transcription. Phonetic units include symbolic representations of sound units to be eventually combined and output by the system 100 as speech. Various sound units may be used for dividing text data for purposes of speech synthesis. The TTS component 314 may process speech based on phonemes (i.e., individual sounds), half-phonemes, di-phones (i.e., the last half of one phoneme coupled with the first half of an adjacent phoneme), bi-phones (i.e., two consecutive phonemes), syllables, words, phrases, sentences, or other units. Each word may be mapped to one or more phonetic units. Such mapping may be performed using a language dictionary stored by the system 100, for example in the TTS storage 320. The linguistic analysis performed by the TTSFE 316 may also identify different grammatical components such as prefixes, suffixes, phrases, punctuation, syntactic boundaries, or the like. Such grammatical components may be used by the TTS component 314 to craft a natural sounding audio waveform output. The language dictionary may also include letter-to-sound rules and other tools that may be used to pronounce previously unidentified words or letter combinations that may be encountered by the TTS component 314. Generally, the more information included in the language dictionary, the higher quality the speech output.

Based on the linguistic analysis, the TTSFE 316 may then perform linguistic prosody generation where the phonetic units are annotated with desired prosodic characteristics, also called acoustic features, which indicate how the desired phonetic units are to be pronounced in the eventual output speech. During this stage, the TTSFE 316 may consider and incorporate any prosodic annotations that accompanied the text data input to the TTS component 314. Such acoustic features may include pitch, energy, duration, and the like. Application of acoustic features may be based on prosodic models available to the TTS component 314. Such prosodic models indicate how specific phonetic units are to be pronounced in certain circumstances. A prosodic model may consider, for example, a phoneme's position in a syllable, a syllable's position in a word, a word's position in a sentence or phrase, neighboring phonetic units, etc. As with the language dictionary, a prosodic model with more information may result in higher quality speech output than prosodic models with less information.

The output of the TTSFE 316, referred to as a symbolic linguistic representation, may include a sequence of phonetic units annotated with prosodic characteristics. This symbolic linguistic representation may be sent to the speech synthesis engine 318, also known as a synthesizer, for conversion into an audio waveform of speech for output to an audio output device and eventually to a user. The speech synthesis engine 318 may be configured to convert the input text data into high-quality natural-sounding speech in an efficient manner. Such high-quality speech may be configured to sound as much like a human speaker as possible, or may be configured to be understandable to a listener without attempts to mimic a precise human voice.

The speech synthesis engine 318 may perform speech synthesis using one or more different methods. In one method of synthesis called unit selection, a unit selection engine 330 matches the symbolic linguistic representation created by the TTSFE 316 against a database of recorded speech, such as a database of a voice corpus. The unit selection engine 330 matches the symbolic linguistic representation against spoken audio units in the database. Matching units are selected and concatenated together to form a speech output. Each unit includes an audio waveform corresponding with a phonetic unit, such as a short .wav file of the specific sound, along with a description of the various acoustic features associated with the .wav file (e.g., its pitch, energy, etc.), as well as other information, such as where the phonetic unit appears in a word, sentence, or phrase, neighboring phonetic units, etc. Using all the information in the unit database, the unit selection engine 330 may match units to the input text data to create a natural sounding waveform. The unit database may include multiple examples of phonetic units to provide the system 100 with many different options for concatenating units into speech. One benefit of unit selection is that, depending on the size of the database, a natural sounding speech output may be generated. As described above, the larger the unit database of the voice corpus, the more likely the system 100 will be able to construct natural sounding speech.

In another method of synthesis called parametric synthesis, parameters such as frequency, volume, and noise are varied by a parametric synthesis engine 332, a digital signal processor, or other audio generation device to create an artificial speech waveform output. Parametric synthesis uses a computerized voice generator, sometimes called a vocoder. Parametric synthesis may use an acoustic model and various statistical techniques to match a symbolic linguistic representation with desired output speech parameters. Parametric synthesis may include the ability to be accurate at high processing speeds, as well as the ability to process speech without large databases associated with unit selection, but also typically produces an output speech quality that may not match that of unit selection. Unit selection and parametric techniques may be performed individually or combined together and/or combined with other synthesis techniques to produce speech audio data output.

Parametric speech synthesis may be performed as follows. The TTS component 314 may include an acoustic model, or other models, which may convert a symbolic linguistic representation into a synthetic acoustic waveform of the input text data based on audio signal manipulation. The acoustic model includes rules which may be used by the parametric synthesis engine 332 to assign specific audio waveform parameters to input phonetic units and/or prosodic annotations. The rules may be used to calculate a score representing a likelihood that a particular audio output parameter(s) (e.g., frequency, volume, etc.) corresponds to the portion of the input symbolic linguistic representation received from the TTSFE 316.

The parametric synthesis engine 332 may use a number of techniques to match speech to be synthesized with input phonetic units and/or prosodic annotations. One common technique is using HMMs. HMMs may be used to determine probabilities that audio output should match textual input. HMMs may be used to translate from parameters from the linguistic and acoustic space to parameters to be used by a vocoder (i.e., the digital voice encoder) to artificially synthesize the desired speech. Using HMMs, a number of states are presented, in which the states together represent one or more potential acoustic parameters to be output to the vocoder and each state is associated with a model, such as a Gaussian mixture model. Transitions between states may also have an associated probability, representing a likelihood that a current state may be reached from a previous state. Sounds to be output may be represented as paths between states of the HMM and multiple paths may represent multiple possible audio matches for the same input text data. Each portion of text data may be represented by multiple potential states corresponding to different known pronunciations of phonemes and their parts (e.g., phoneme identity, stress, accent, position, etc.). An initial determination of a probability of a potential phoneme may be associated with one state. As new text data is processed by the speech synthesis engine 318, the state may change or stay the same, based on processing of the new text data. For example, the pronunciation of a previously processed word might change based on later processed words. A Viterbi algorithm may be used to find the most likely sequence of states based on the processed text data. The HMMs may generate speech in parametrized form including parameters such as fundamental frequency (f0), noise envelope, spectral envelope, etc. that are translated by a vocoder into audio segments. The output parameters may be configured for particular vocoders such as a STRAIGHT vocoder, TANDEM-STRAIGHT vocoder, harmonic plus noise (HNM) based vocoders, code-excited linear prediction (CELP) vocoders, GlottHMM vocoders, harmonic/stochastic model (HSM) vocoders, or others.

For example, to create the customized speech output of the system 100, the system 100 may be configured with multiple voice inventories 378 (stored in TTS voice unit storage 372), where each unit database is configured with a different "voice." Such voice inventories may also be linked to user accounts. For example, one voice corpus may be stored to be used to synthesize whispered speech (or speech approximating whispered speech), another may be stored to be used to synthesize excited speech (or speech approximating excited speech), and so on. To create the different voice corpuses, a multitude of TTS training utterances may be spoken by an individual and recorded by the system 100. The TTS training utterances used to train a TTS voice corpus may be different from the training utterances used to train an ASR system. The audio associated with the TTS training utterances may then be split into small audio segments and stored as part of a voice corpus. The individual speaking the TTS training utterances may speak in different voice qualities to create the customized voice corpuses, for example the individual may whisper the training utterances, say them in an excited voice, and so on. Thus, the audio of each customized voice corpus may match a desired speech quality. The customized voice inventory 378 may then be used during runtime to perform unit selection to synthesize speech.

As an alternative to customized voice corpuses or customized parametric "voices," one or more filters may be used to alter traditional TTS output to match a desired speech quality (e.g., whisper, shout, etc.). For example, the TTS component 314 may synthesize speech as normal, but the system 100, either as part of the TTS component 314 or otherwise, may apply a filter to make the synthesized speech take on the desired speech quality. In this manner a traditional TTS output may be altered to take on the desired speech quality.

During runtime the TTS component 314 may receive text data for speech synthesis along with an indicator for a desired speech quality of the output speech. The TTS component 314 may then select a voice matching the speech quality, either for unit selection or parametric synthesis, and synthesize speech using the received text data and speech quality indicator.

Figure 4:
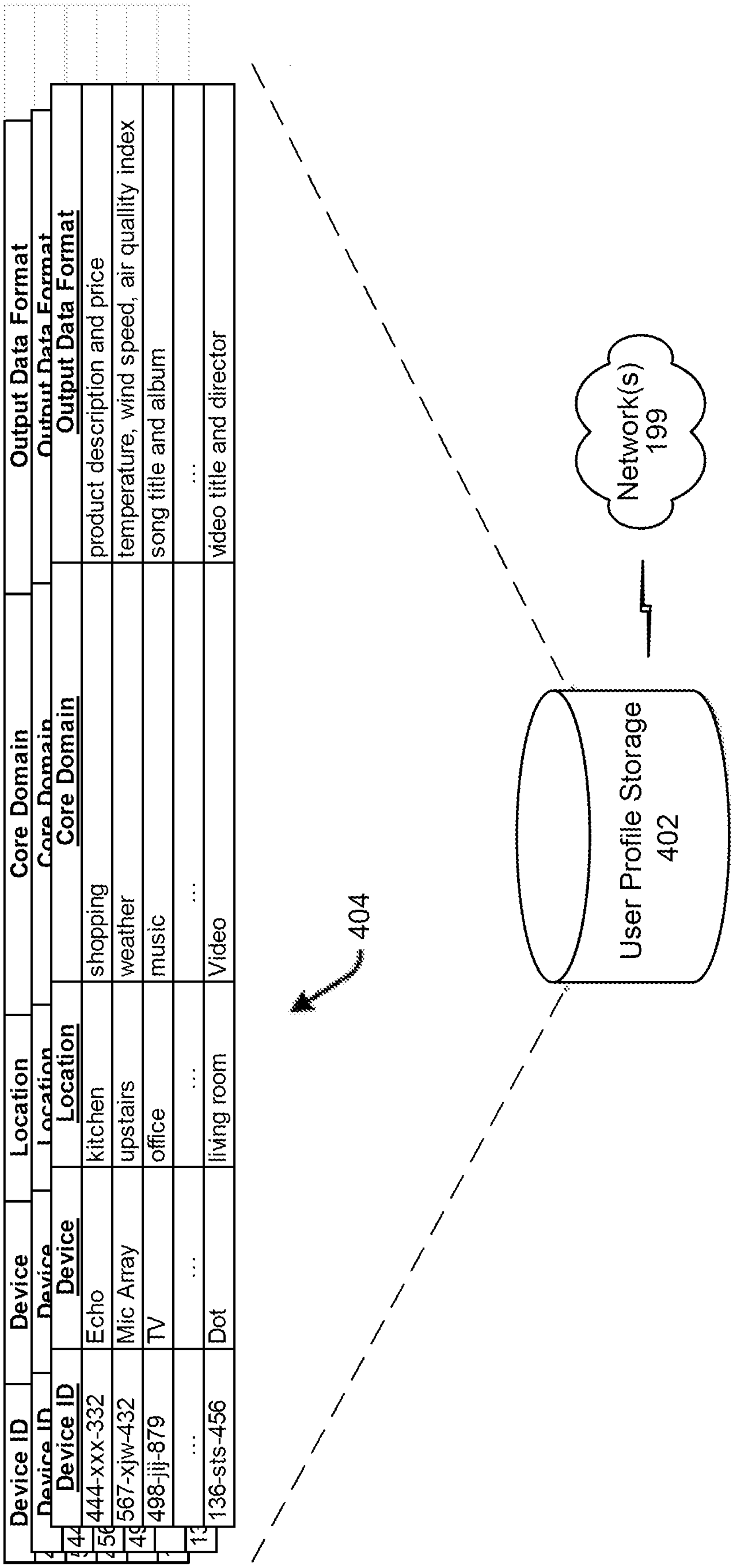
FIG. 4 illustrates data stored and associated with user profiles according to embodiments of the present disclosure.

FIG. 4 illustrates a user profile storage 402 that includes data regarding user accounts 404 as described herein. The user profile storage 402 may be located proximate to the server(s) 120, or may otherwise be in communication with various components, for example over the network(s) 199. The user profile storage 402 may include a variety of information related to individual users, accounts, etc. that interact with the system 100. For illustration, as shown in FIG. 4, the user profile storage 402 may include data regarding the devices associated with particular individual user accounts 404. In an example, the user profile storage 402 is a cloud-based storage. Each user profile 404 may include data such as device identifier (ID) data, name of device data, and location of device data for different devices. In addition, each user profile 404 may include user settings, preferences, permissions, etc. with respect to certain domains including the format of output data from a domain as well as what customized data may be requested for certain intents to be executed by the domain. For example, a particular user profile 404 may indicate that output data related to a product information request to a shopping core domain should include output portions corresponding to product description and price, output data for weather information from a weather core domain should include portions corresponding to temperature, wind speed, and air quality index, etc. If desired output content is not stored by or otherwise directly available to the server(s) 120, the application server(s) 125 storing or having access to the content may be indicated in the user profile 404 as well. For example, if the server(s) 120 does not store wind speed content, an application server(s) 125 (for example, corresponding to an add-on domain) storing or having access to wind speed content may be indicated in the user profile 404. Each user profile 404 may additionally include user affinity data, such as occupation of the user, hobbies of the user, etc.

FIG. 5A illustrates a default weather core domain output data format according to the present disclosure. As illustrated, the default weather core domain output data format is configured with an intro portion that indicates the location of the device that captured the user utterance, as well as a temperature portion that includes the high and low temperatures of the device's location for that day. FIG. 5B illustrates a weather core domain output data format altered based on preferences contained in a user profile. As illustrated in FIG. 5B, the altered weather core domain output data format is configured with the intro and temperature portions of the default output data format, as well as an air index portion and an average wind speed portion. Other configurations are also possible.

Figure 6A:
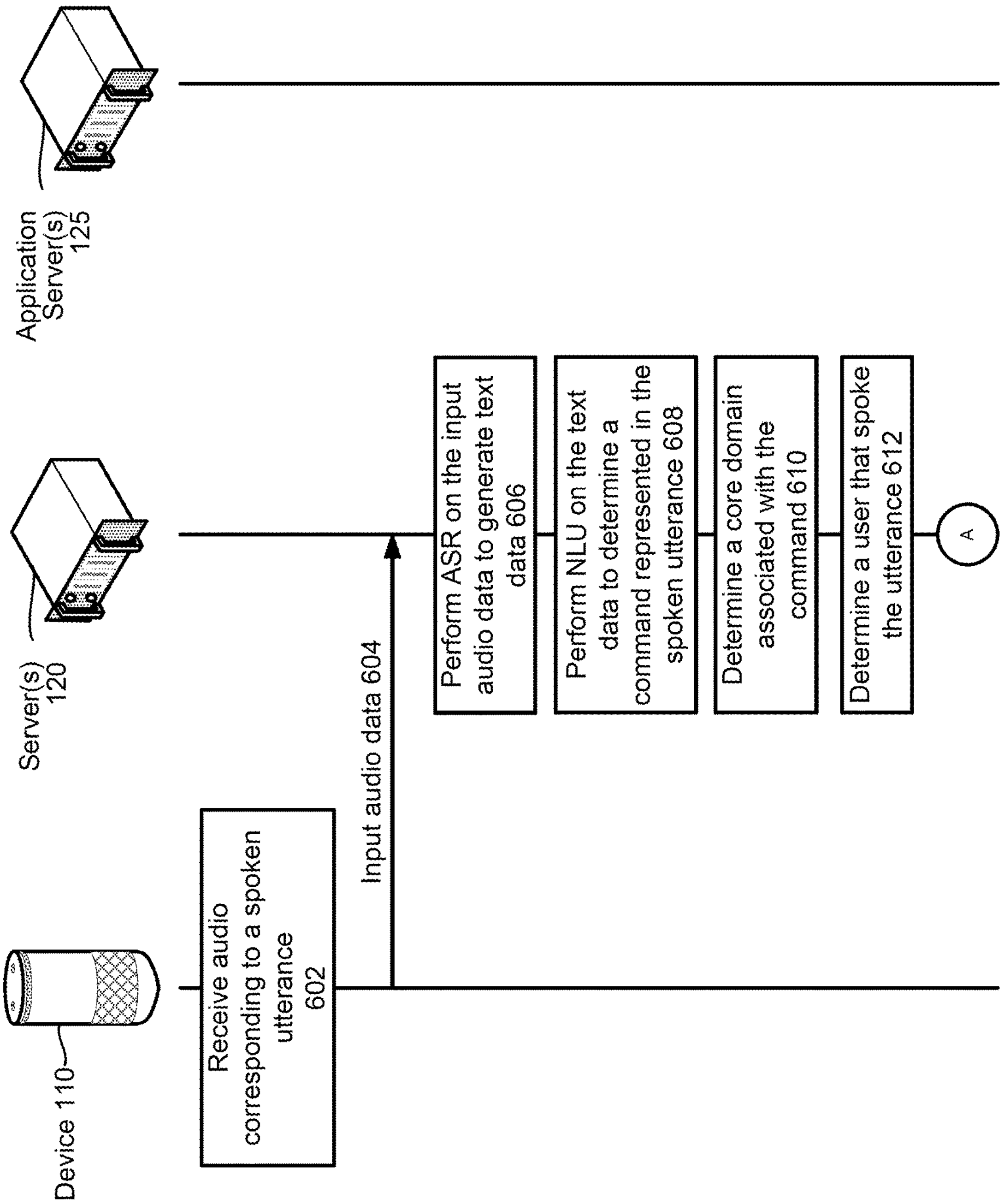
FIGS. 6A through 6C are a signal flow diagram illustrating the processing of a user command and the generation of responsive content using configurable output data formats according to embodiments of the present disclosure.
Figure 6B:
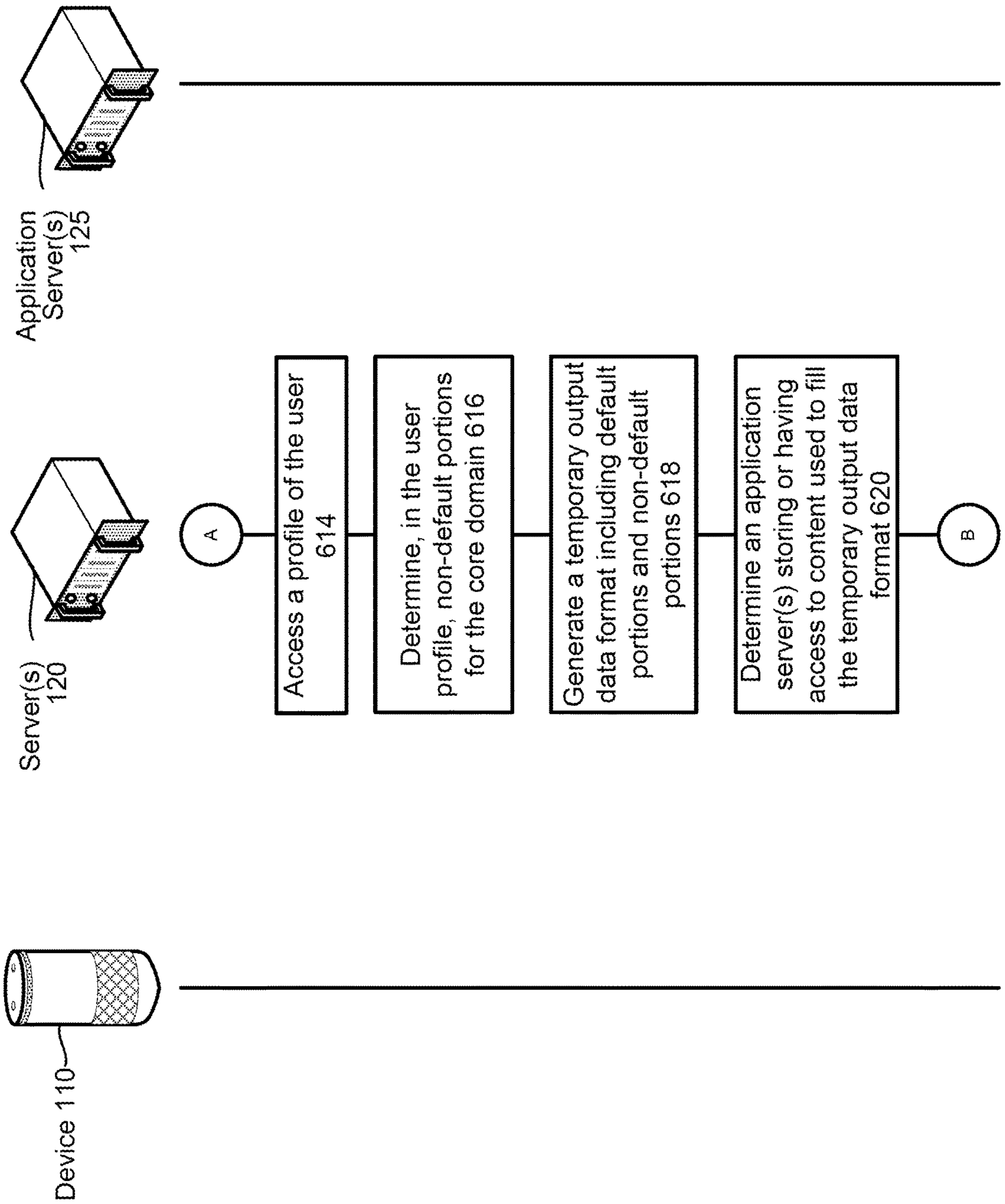
Figure 6C:
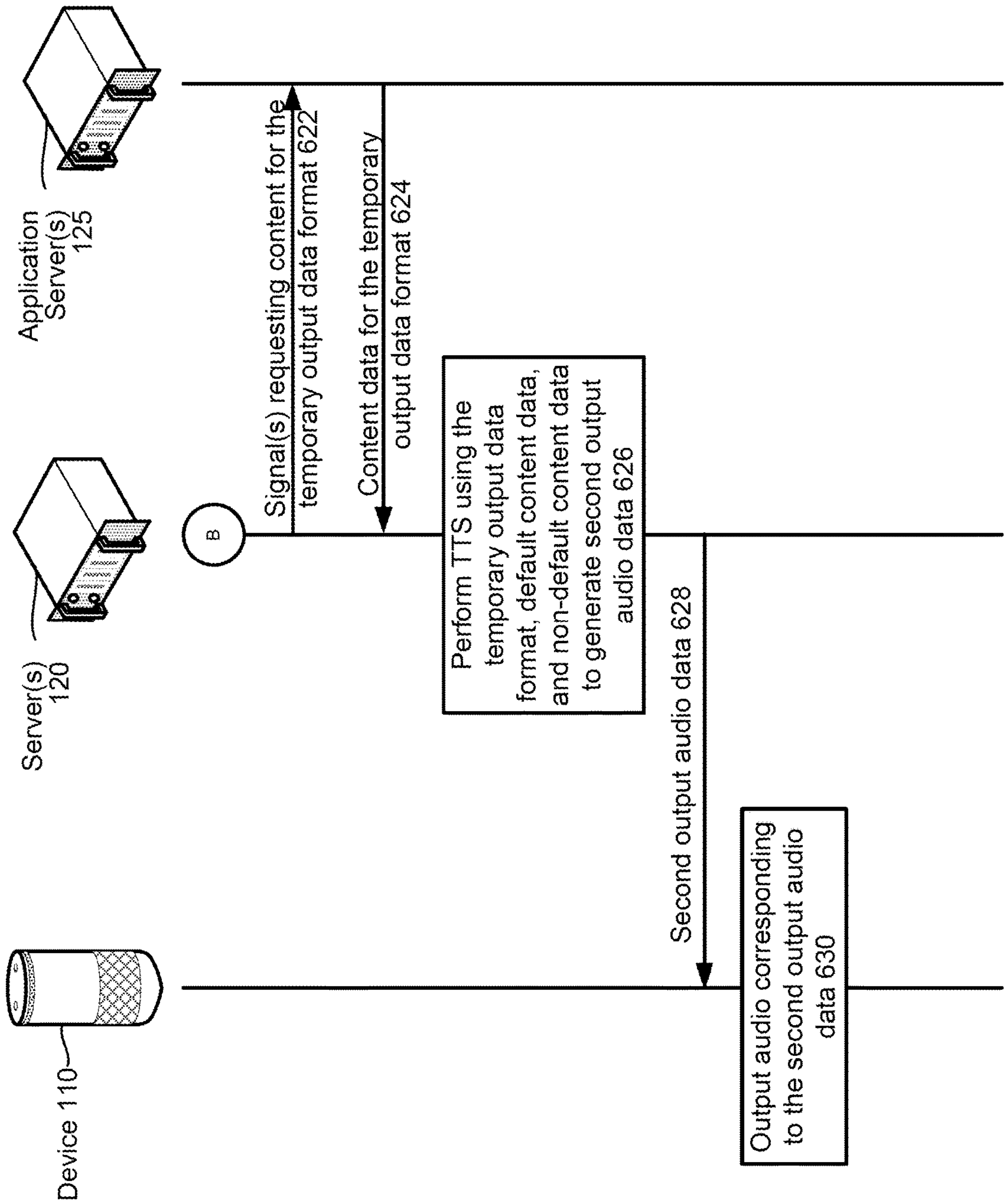

FIGS. 6A through 6C illustrate the processing of a user command and the generation of responsive content using either a default or a temporary output data format. A temporary output data format is one that the server(s) 120 deletes from memory after output audio data is generated therefrom. The speech-controlled device 110 receives (602) audio corresponding to a spoken utterance, and sends (604) input audio data corresponding thereto to the server(s) 120 for processing.

The server(s) 120, upon receiving the input audio data, performs speech processing on the input audio data. Namely, the server(s) 120 may perform (606) ASR on the input audio data to generate text data, and may perform (608) NLU on the text data to determine a command represented in the spoken utterance.

The server(s) 120 may determine (610) a core domain associated with the command. For example, if the user command is "what is the weather," the core domain associated therewith may be a weather domain. For further example, if the user command is "play Adele's Water Under the Bridge," the core domain associated therewith may be a music domain. A domain may correspond to a type of content that may be output by the system. Types of content may include, for example, weather content, music content, video content, or the like. The variety and amount of user commands and associated core domains is system configurable.

The server(s) 120 may also determine (612) a user that spoke the utterance. This may include receiving biometric data a user, image data including a representation of a face of a user, and/or audio data including speech of a user, and comparing such to biometric data, image data, and/or audio data associated with users in a profile of the device 110 from which the spoken utterance audio data was received by the server(s) 120.

The server(s) 120 may access (614 illustrated in FIG. 6B) a profile of the determined user, and determine (616), in the user profile, non-default portions for the core domain. The server(s) 120 may generate (618) a temporary output data format including default portions (i.e., portions indicated in the default output data format for the core domain) as well as non-default portions (i.e., portions associated with the core domain in the user profile, but not part of the default output data format for the core domain).

The server(s) 120 may determine (620) one or more application servers 125 storing or having access to content used to fill portions of the temporary output data format. If more than one application server 125 is determined to store or have access to content needed for a single portion of the temporary output data format, the server(s) 120 may choose a single application server 125 to receive the content from based on user preferences or other considerations.

The server(s) 120 may send (622 illustrated in FIG. 6C) a signal to each application server 125 from which content is desired, with each signal requesting respective content for the temporary output data format. If a single application server 125 stores or has access to content used to fill multiple portions of the temporary output data format, a single signal indicating and requesting all desired content may be sent to the application server 125, or separate signals indicating separate portions of desired content may be sent to the application server 125.

The server(s) 120 receives (624) content data for the temporary output data format from one or more application servers 125. The server(s) 120 also performs (626 illustrated in FIG. 6C) TTS using the temporary output data format, received content data used to fill default portions of the temporary output data format, and received content data used to fill non-default portions of the temporary output data format to generate second output audio data. The content data may be received by the server(s) 120 as either text data or audio data. The server(s) 120 may insert received text data and audio data into appropriate segments of the temporary output data format, and perform TTS on the text portions of the filled temporary output data format, but not audio portions of the filled temporary output data format. The server(s) 120 sends (628) the second output audio data to the device 110, and the device 110 outputs (630) audio corresponding to the second output audio data.

Figure 7A:
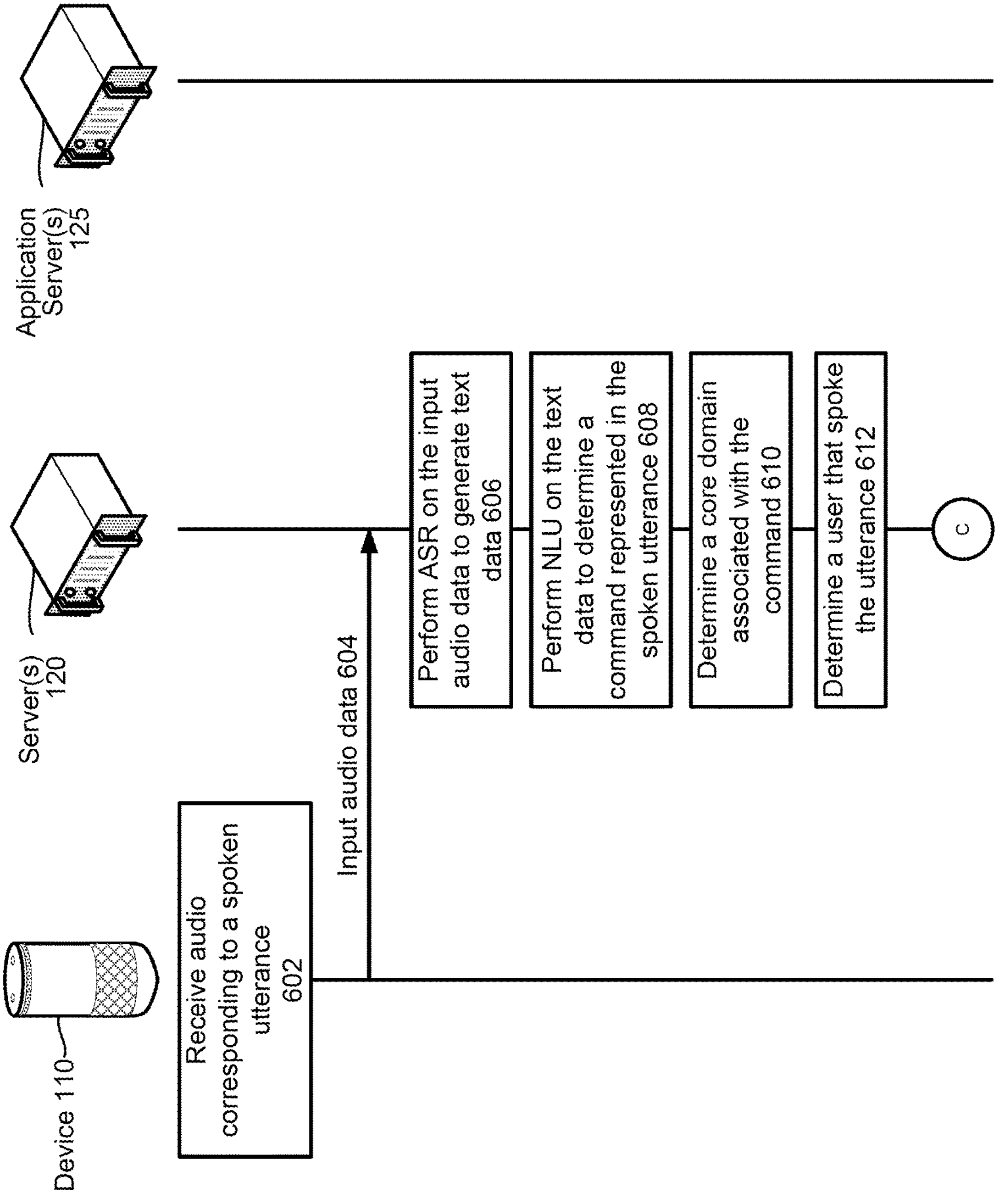
FIGS. 7A through 7C are a signal flow diagram illustrating the processing of a user command and the generation of responsive content using configurable output data formats according to embodiments of the present disclosure.
Figure 7B:
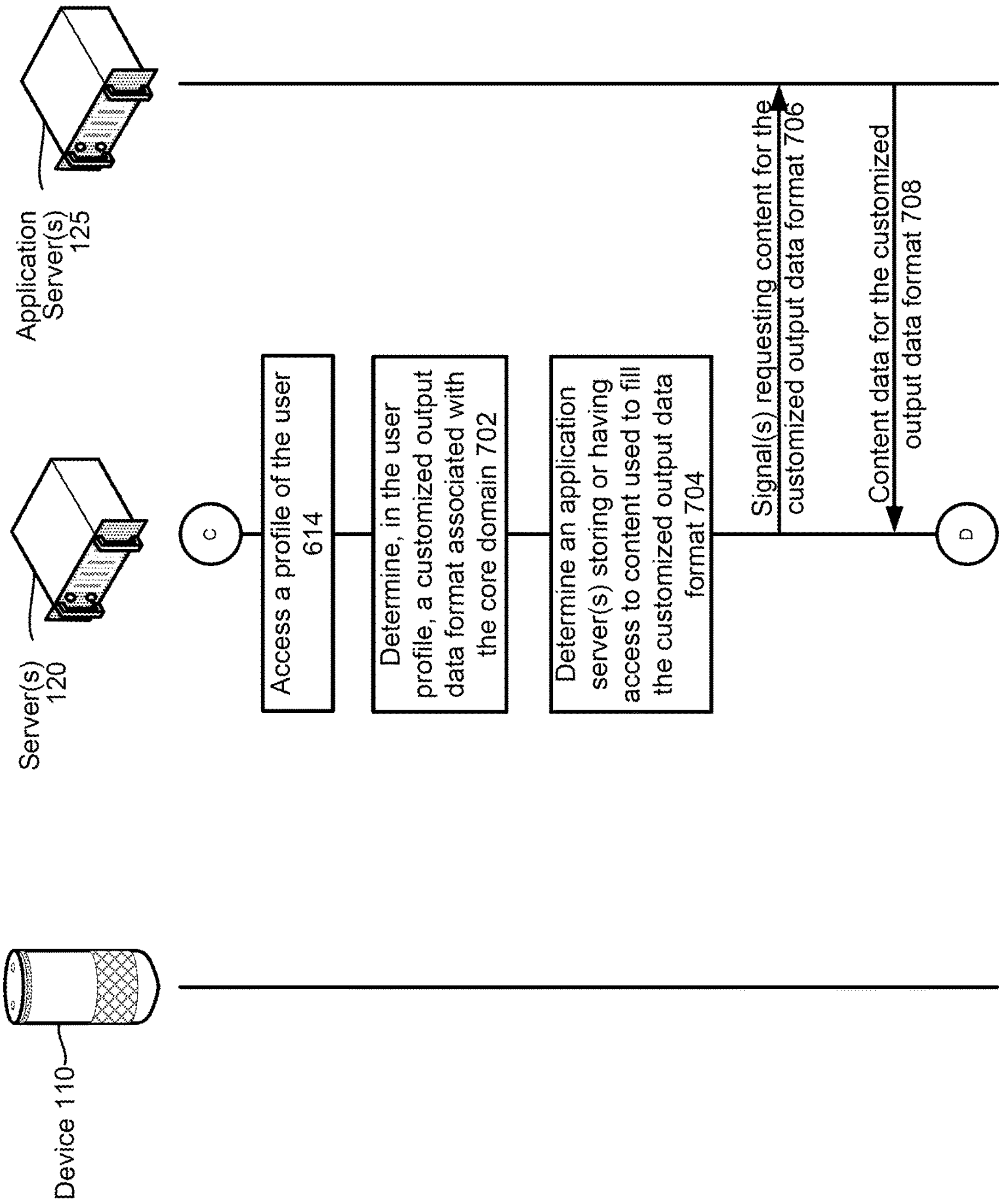
Figure 7C:
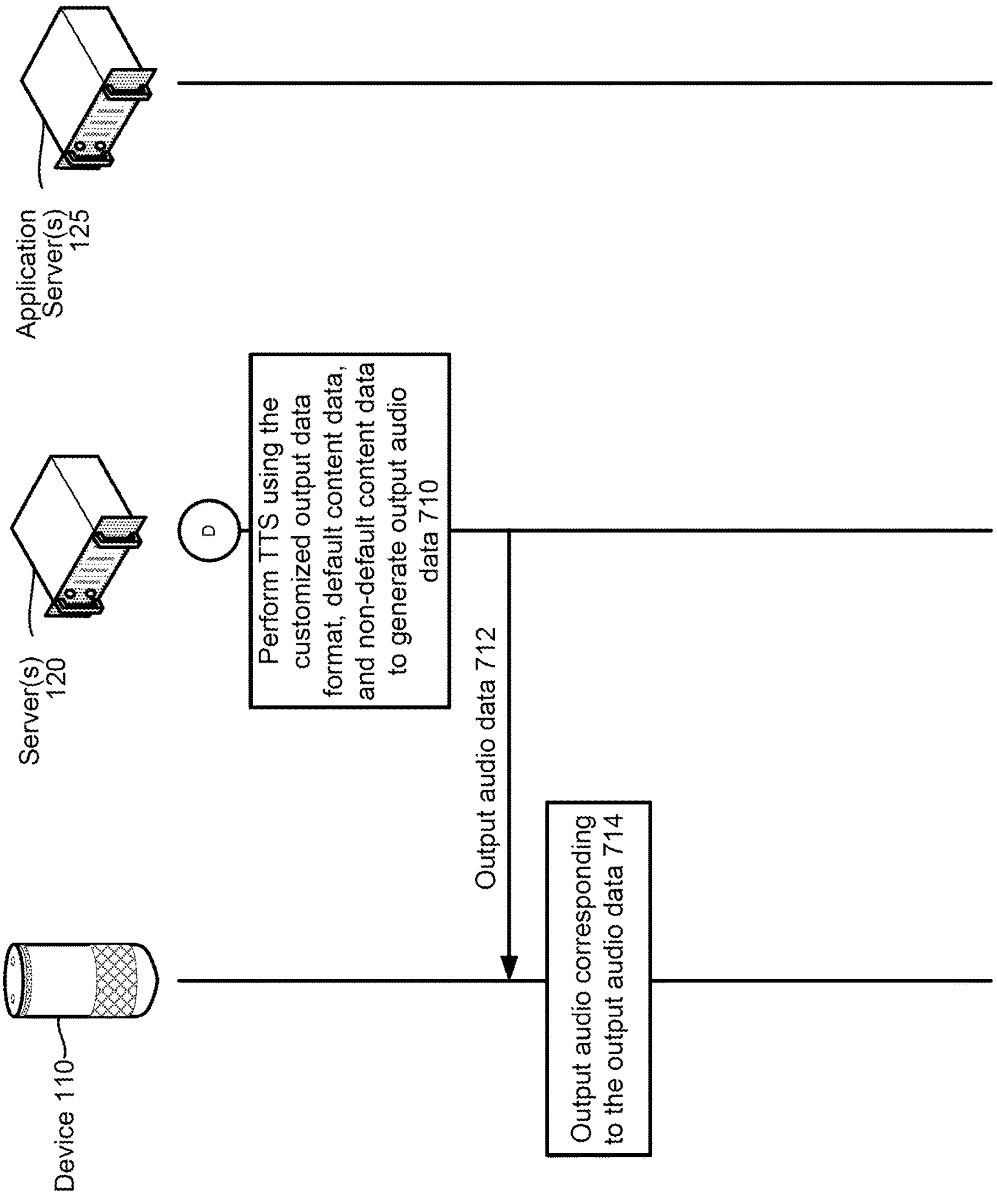

As indicated above, the system 100 (e.g., the server(s) 120) may create a temporary output data format each time a user speaks a command that invokes a core domain for which the user prefers non-default content to be output. The user may speak a command that invokes a given core domain multiple times. Thus, rather than repeatedly create a temporary output data format each time, the server(s) 120 may create a customized output data format including default and non-default portions, and store such in a profile of the user (as illustrated in FIGS. 7A through 7C). The customized output data format may be generated when the user indicates the non-default portions. Alternatively, the customized output data format may be generated the first time a user speaks a command triggering the core domain after indicating the non-default portions.

The speech-controlled device 110 receives (602 illustrated in FIG. 7A) audio corresponding to a spoken utterance, and sends (604) input audio data corresponding thereto to the server(s) 120 for processing.

The server(s) 120, upon receiving the input audio data, performs speech processing on the input audio data. Namely, the server(s) 120 may perform (606) ASR on the input audio data to generate text data, and may perform (608) NLU on the text data to determine a command represented in the spoken utterance.

The server(s) 120 may determine (610) a core domain associated with the command. For example, if the user command is "what is the weather," the core domain associated therewith may be a weather domain. For further example, if the user command is "play Adele's Water Under the Bridge," the core domain associated therewith may be a music domain. A domain may correspond to a type of content that may be output by the system. Types of content may include, for example, weather content, music content, video content, or the like. The variety and amount of user commands and associated core domains is system configurable.

The server(s) 120 may also determine (612) a user that spoke the utterance. This may include receiving biometric data a user, image data including a representation of a face of a user, and/or audio data including speech of a user, and comparing such to biometric data, image data, and/or audio data associated with users in a profile of the device 110 from which the spoken utterance audio data was received by the server(s) 120.

The server(s) 120 may access (614 illustrated in FIG. 7B) a profile of the determined user, and determine (702), in the user profile, a customized output data format associated with the core domain. The customized output data format may be generated by the server(s) 120 when the user indicates non-default portions to be output. The customized output data format may be generated by adding non-default portions to the default output data format of the core domain.

The server(s) 120 may determine (704) one or more application servers 125 storing or having access to content used to fill portions of the customized output data format. If more than one application server 125 is determined to store or have access to content needed for a single portion of the customized output data format, the server(s) 120 may choose a single application server 125 to receive the content from based on user preferences or other considerations.

The server(s) 120 may send (706) a signal to each application server 125 from which content is desired, with each signal requesting respective content for the customized output data format. If a single application server 125 stores or has access to content used to fill multiple portions of the customized output data format, a single signal indicating and requesting all desired content may be sent to the application server 125, or separate signals indicating separate portions of desired content may be sent to the application server 125.

The server(s) 120 receives (708) content data for the customized output data format from one or more application servers 125. The server(s) 120 also performs (710 illustrated in FIG. 7C) TTS using the customized output data format, received content data used to fill portions of the customized output data format corresponding to portions of the default output data format for the core domain, and received content data used to fill portions of the customized output data format not included in the default output data format to generate output audio data. The content data may be received by the server(s) 120 as either text data or audio data. The server(s) 120 may insert received text data and audio data into appropriate segments of the customized output data format, and perform TTS on the text portions of the filled customized output data format, but not audio portions of the filled customized output data format. The server(s) 120 sends (712) the output audio data to the device 110, and the device 110 outputs (714) audio corresponding to the output audio data.

As described above, the text data processed by the system to ultimately determine output content is generated from audio data corresponding to a user utterance. For example, each time a user enters their house they may say "how many messages do I have" and the system may response. It should also be appreciated that the text data may be generated based on an event. According to the above example, rather than require the user to say "how many messages do I have," the system may determine when a user enters their house, and may therefrom automatically generate text data corresponding to "how many messages do I have." The user may instruct the system (e.g., in the user's preferences) that each time the user enters their house, the user wants the system to tell the user how many messages the user has. Alternatively, the system may keep a log of events and corresponding user commands. After an event occurs with a single corresponding command over a threshold amount of times, the system may automatically configure itself to generate the text data corresponding to the command with user instruction to do so. The system may store event data and corresponding text data in the user's profile.

FIG. 8 illustrates an output data format associated with domain specific slot data. Each domain invoked by an output data format may be associated with a different 1P or 3P application. Each 1P or 3P application may require different data in order to properly determine data responsive to a user command. The server(s) 120 may determine the data needed for each domain, and associate such data with the respective domain in the output data format as slots/data fields that need to be filled. The slots and/or intents may be represented by indicators of what data is requested from the domain, such as those illustrated in FIG. 8. For example, a user command of "what is the weather" may invoke an output data format including a default portion associated with a core domain, and a non-default portion corresponding to wind speed from another domain. The core domain (Domain 1) may require data corresponding to the type of user command as well as the type of data requested from the core domain, and the other domain (Domain 2) may require data corresponding to the type of user command as well as the data requested from the other domain. Context data may also be passed to the domain(s). Context data includes, for example, user profile data, user occupation data, user affinity (e.g., user history regarding interactions with the system) data, and the like. If the output data format is associated with a user profile, the server(s) 120 may store and associate such data in the user profile.

In another example, a user profile may indicate that for intents involving recipes should request the high altitude version of the recipe. As shown in FIG. 8, a user request for a recipe corresponding to this user profile may append the slot related to altitude to a recipe request. In another example, a user profile may indicate that requests for information be taken from the home country of a user, particularly if that home country is different from the user's location or device location. Thus, information requests may have appended to them a slot corresponding to the geographic location of the home country.

Associating the slot data with the domain in the output data format ensures the system will obtain and output proper data to the user even if speech processing of the user command does not result in identification of the slots. For example, the server(s) 120 may perform ASR on audio data to generate text data. The server(s) 120 may then perform NLU on the text data to determine the user command. In some cases, NLU does not determine slots of data needed by a given domain. In such situations, the server(s) 120 may determine such data slots from the user's profile.

In certain implementations, a command processor 290 for a first domain (domain 1) may be configured to control a second domain (domain 2). That is, domain 1 may specify the data sent to domain 2. For example, domain 1 may ingest the data input therein and determine, based on user information, that other personalized information may be provided to the user. In that case, if domain 1 does not have access to the other personalized information, domain 1 may indicate to the system that domain 2 should be engaged to obtain the other information.

The system may also be configured to append additional information to default output information without a user instruction to do so. For example, the default output format for a weather domain may include temperature information. In some instances, the system may append additional data to the default output data based on user location. For example, if the user is determined to be in Los Angeles, Calif., the system may also output air quality information. In another example, if the user is determined to be in Colorado, the system may also output snowfall information. This type of functionality may be structured as if-then processing. For example, the system may have store data with respect to various locations specific to a certain domain. For example, the weather domain may be configured to always output temperature information. The weather domain may also be associated with if-then or other logic specific to certain conditions, such as different information to be provided for various locations. For example, the if-then logic for the weather domain may include if the user is in Los Angeles, Calif., then output air quality information; if the user is in Colorado, then output snowfall information; if the user is in Arizona, then output heat index information; etc.

In other implementations, the system may be configured to prompt the user with respect to additional information to be output. For example, a weather domain may be configured to output temperature information. When a user asks "what is the weather," the system may determine the user's location, and determine a temperature corresponding thereto. In addition, the system may determine if-then logic associated with the location. Thus, in according to the above example, the system may output "I noticed you are in Colorado. The temperature in Colorado today is 78° F. Would you also like to know the snowfall for today?" In the aforementioned output, the statement "would you also like to know the snowfall today" may be triggered by if-then logic indicating if the user is in Colorado, the output snowfall information.

Domain developers may specify the extra information or add-ons that may be triggered and output by a given domain. However, the domains developers may not set when the additional information or add-ons may be triggered. The system disclosed herein may be configured to enable the add-ons and/or the add-ons may be enabled by a user.

Figure 9:
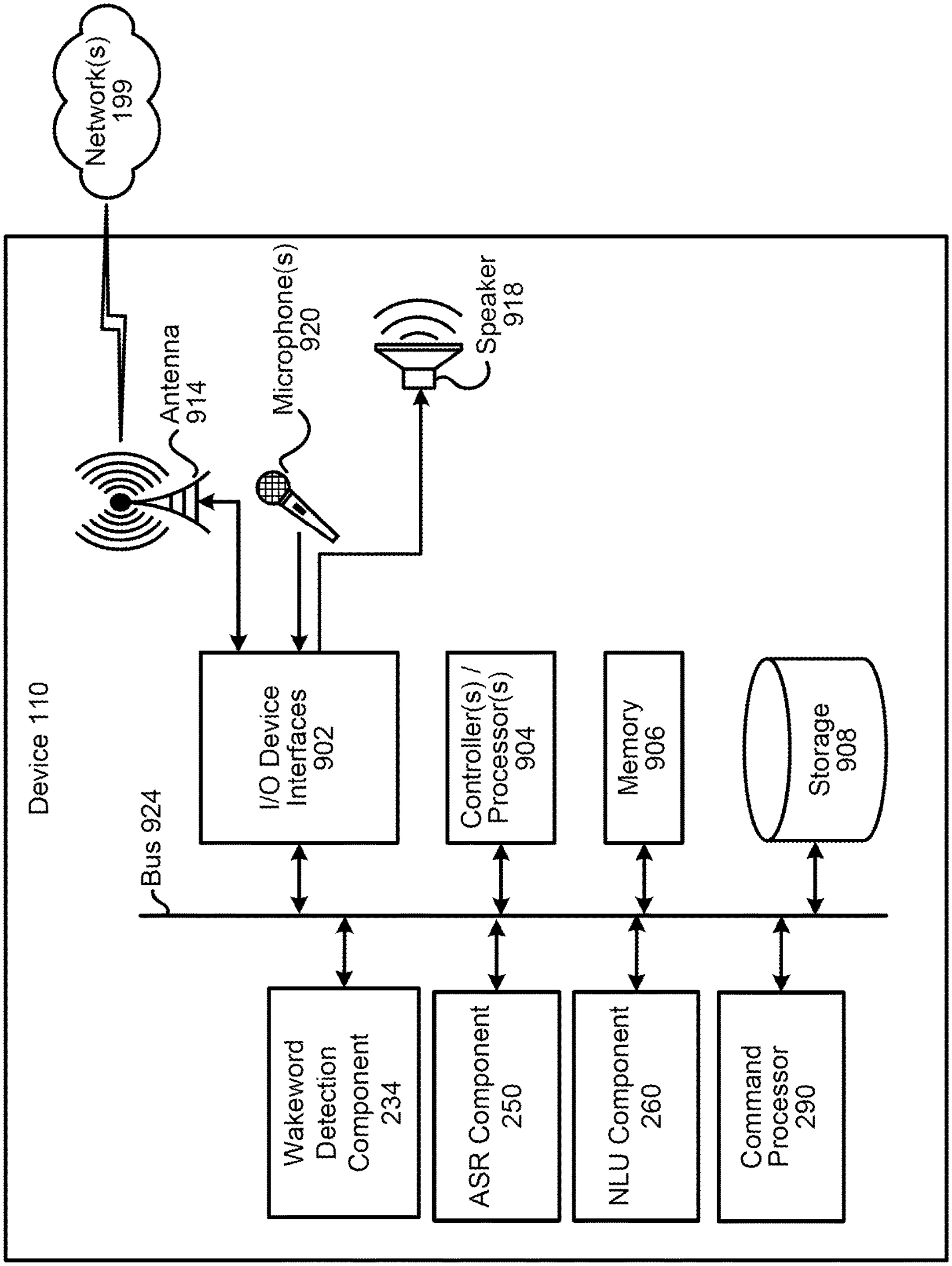
FIG. 9 is a block diagram conceptually illustrating example components of a device according to embodiments of the present disclosure.
Figure 10:
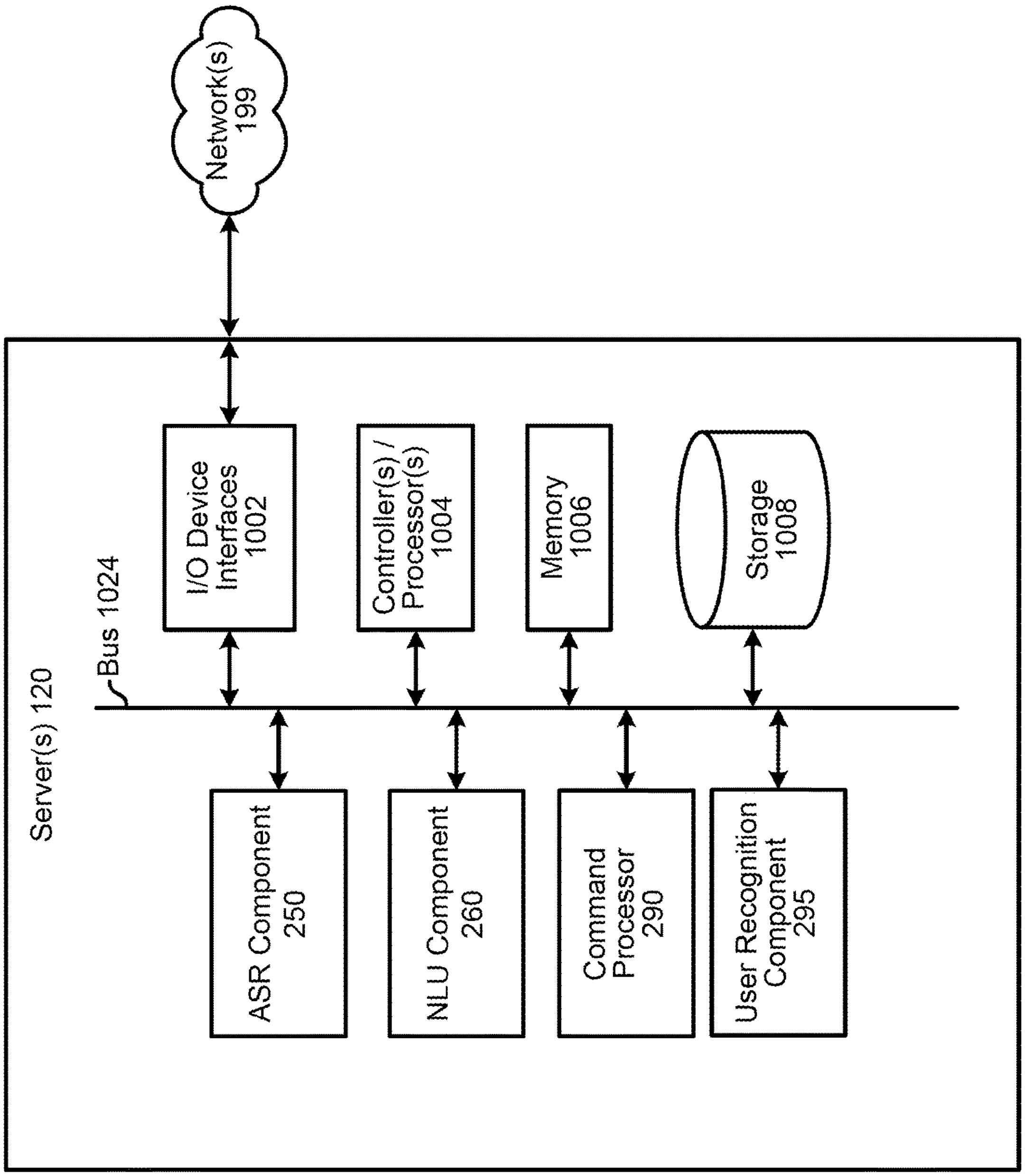
FIG. 10 is a block diagram conceptually illustrating example components of a server according to embodiments of the present disclosure.

FIG. 9 is a block diagram conceptually illustrating a user device that may be used with the described system. FIG. 10 is a block diagram conceptually illustrating example components of a remote device, such as the server(s) 120 that may assist with ASR processing, NLU processing, or command processing. Multiple servers 120 may be included in the system 100, such as one server 120 for performing ASR, one server 120 for performing NLU, etc. In operation, each of these devices (or groups of devices) may include computer-readable and computer-executable instructions that reside on the respective device (110/120), as will be discussed further below.

Each of these devices (110/120) may include one or more controllers/processors (904/1004), which may each include a central processing unit (CPU) for processing data and computer-readable instructions, and a memory (906/1006) for storing data and instructions of the respective device. The memories (906/1006) may individually include volatile random access memory (RAM), non-volatile read only memory (ROM), non-volatile magnetoresistive (MRAM), and/or other types of memory. Each device (110/120) may also include a data storage component (908/1008) for storing data and controller/processor-executable instructions. Each data storage component (908/1008) may individually include one or more non-volatile storage types such as magnetic storage, optical storage, solid-state storage, etc. Each device (110/120) may also be connected to removable or external non-volatile memory and/or storage (such as a removable memory card, memory key drive, networked storage, etc.) through respective input/output device interfaces (902/1002).

Computer instructions for operating each device (110/120) and its various components may be executed by the respective device's controller(s)/processor(s) (904/1004), using the memory (906/1006) as temporary "working" storage at runtime. A device's computer instructions may be stored in a non-transitory manner in non-volatile memory (906/1006), storage (908/1008), or an external device(s). Alternatively, some or all of the executable instructions may be embedded in hardware or firmware on the respective device in addition to or instead of software.

Each device (110/120) includes input/output device interfaces (902/1002). A variety of components may be connected through the input/output device interfaces (902/1002), as will be discussed further below. Additionally, each device (110/120) may include an address/data bus (924/1024) for conveying data among components of the respective device. Each component within a device (110/120) may also be directly connected to other components in addition to (or instead of) being connected to other components across the bus (924/1024).

Referring to FIG. 9, the device 110 may include input/output device interfaces 902 that connect to a variety of components such as an audio output component such as a speaker 918, a wired headset or a wireless headset (not illustrated), or other component capable of outputting audio. The device 110 may also include an audio capture component. The audio capture component may be, for example, a microphone 920 or array of microphones, a wired headset or a wireless headset (not illustrated), etc. The microphone 920 may be configured to capture audio. If an array of microphones is included, approximate distance to a sound's point of origin may be determined by acoustic localization based on time and amplitude differences between sounds captured by different microphones of the array.

Via antenna(s) 914, the input/output device interfaces 902 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system 100 may be distributed across a networked environment.

The device 110 and/or the server(s) 120 may include the ASR component 250. The ASR component 250 in the device 110 may be of limited or extended capabilities. The ASR component 250 may include the language models 254 stored in ASR model storage component 252. If limited speech recognition is included, the ASR component 250 may be configured to identify a limited number of words, whereas extended speech recognition may be configured to recognize a much larger range of words.

The device 110 and/or the server(s) 120 may include the NLU component 260. The NLU component 260 in the device 110 may be of limited or extended capabilities. The NLU component 260 may comprise the name entity recognition component 262, the intent classification component 264, and/or other components. The NLU component 260 may also include a stored knowledge base and/or entity library, or those storages may be separately located.

The device 110 and/or the server(s) 120 may also include the command processor 290 configured to execute commands/functions associated with a spoken utterance as described herein.

The device 110 may further include the wakeword detection component 234 as described herein.

The server(s) 120 may further include the user recognition component 295 as described herein.

As noted above, multiple devices may be employed in a single speech processing system. In such a multi-device system, each of the devices may include different components for performing different aspects of the speech processing. The multiple devices may include overlapping components. The components of the device 110 and the server(s) 120, as illustrated in FIGS. 9 and 10, are exemplary, and may be located as a stand-alone device or may be included, in whole or in part, as a component of a larger device or system.

Figure 11:
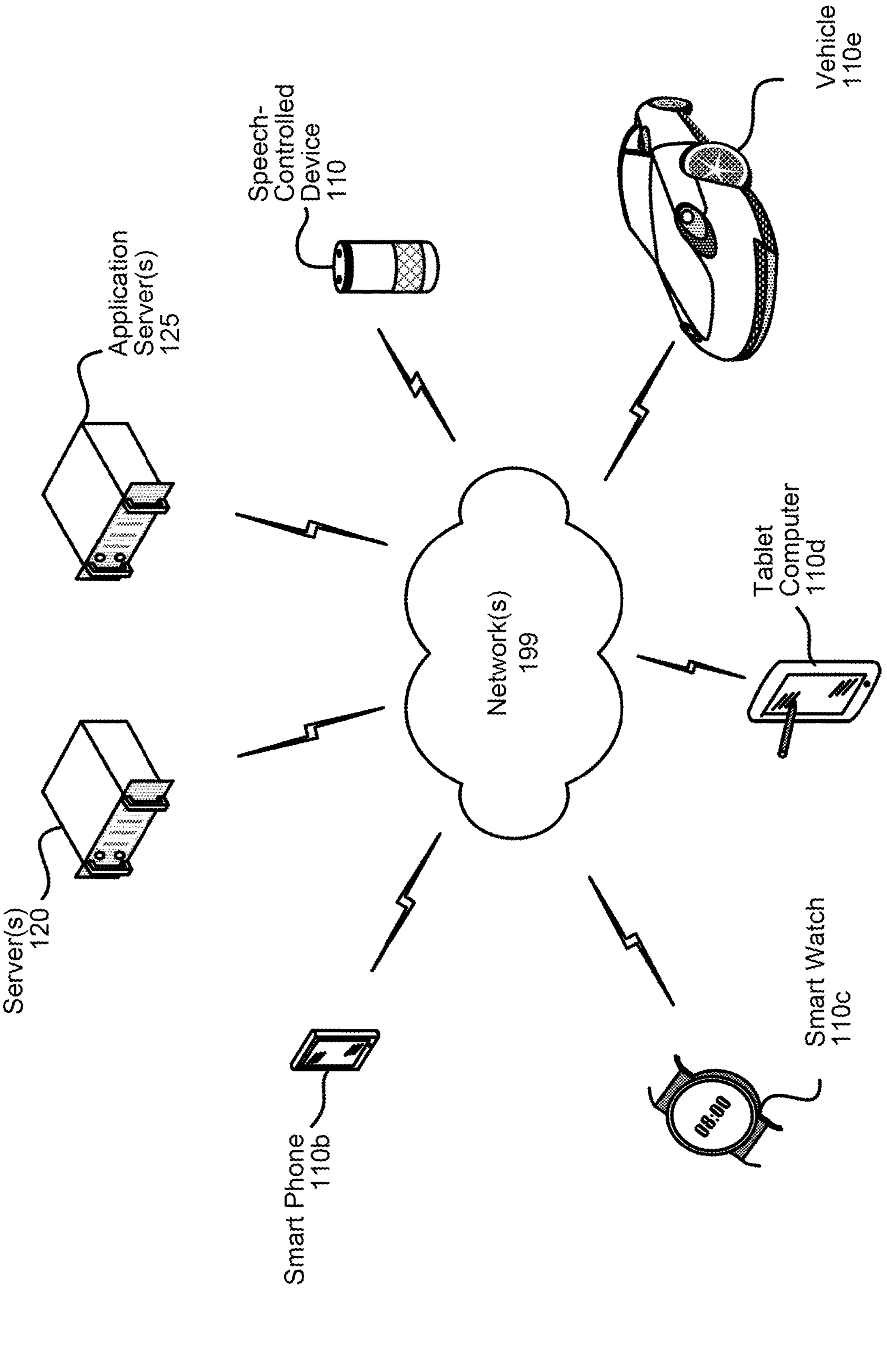
FIG. 11 illustrates an example of a computer network for use with the system.

As illustrated in FIG. 11, multiple devices (110, 110*b*-110*e*, 120. 125) may contain components of the system 100 and the devices may be connected over a network(s) 199. The network(s) 199 may include a local or private network or may include a wide network such as the Internet. Devices may be connected to the network(s) 199 through either wired or wireless connections. For example, the speech-controlled device 110, a smart phone 110*b*, a smart watch 110*c*, a tablet computer 110*d*, and/or a vehicle 110*e* may be connected to the network(s) 199 through a wireless service provider, over a WiFi or cellular network connection, or the like. Other devices are included as network-connected support devices, such as the server(s) 120, application developer devices (e.g., the application server(s) 125), or others. The support devices may connect to the network(s) 199 through a wired connection or wireless connection. Networked devices may capture audio using one-or-more built-in or connected microphones or audio capture devices, with processing performed by ASR, NLU, or other components of the same device or another device connected via the network(s) 199, such as the ASR component 250, the NLU component 260, etc. of one or more servers 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of one or more of the modules and engines may be implemented as in firmware or hardware, such as the AFE 220, which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, comprising:

receiving input data representing a natural language command;

determining that output responsive to the natural language command is to include first content of a default content type;

identifying a profile associated with the input data;

determining that the profile is associated with a non-default content type;

determining, based at least in part on the profile being associated with the non-default content type, that the output is to additionally include second content of the non-default content type;

receiving first data responsive to the natural language command, the first data corresponding to the default content type;

receiving second data responsive to the natural language command, the second data corresponding to the non-default content type; and based at least in part on the first data and the second data, causing the output to include at least the first content of the default content type and the second content of the non-default content type.

2. The computer-implemented method of claim 1, further comprising:

determining a category of the natural language command, wherein determining that the output is to additionally include the second content of the non-default content type is based at least in part on the category.

3. The computer-implemented method of claim 1, further comprising:

determining a geographic location corresponding to the input data, wherein determining that the output is to additionally include the second content of the non-default content type is based at least in part on the geographic location.

4. The computer-implemented method of claim 1, further comprising:

determining a first skill corresponding to the non-default content type; and determining a first component corresponding to the first skill;

wherein the second data is received from the first component.

5. The computer-implemented method of claim 4, wherein determining the first skill is based at least in part on the profile.

6. The computer-implemented method of claim 4, further comprising:

determining a second component, different from the first component, corresponding to the default content type;

wherein the first data is received from the second component.

7. The computer-implemented method of claim 1, wherein the first data and the second data correspond to a same domain of a natural language processing system.

8. The computer-implemented method of claim 1, further comprising:

generating an output data format including a first slot to be populated with the first content and a second slot to be populated with the second content; and configuring output data corresponding to the output data format, the output data including the first data in the first slot and the second data in the second slot, wherein causing the output to include at least the first content and the second content uses the output data.

9. The computer-implemented method of claim 8, wherein generating the output data format is based at least in part on the profile.

10. A system, comprising:

at least one processor; and at least one memory comprising instructions that, when executed by the at least one processor, cause the system to:

receive input data representing a natural language command;

determine that output responsive to the natural language command is to include first content of a default content type;

identify a profile associated with the input data;

determine that the profile is associated with a non-default content type;

determine, based at least in part on the profile being associated with the non-default content type, that the output is to additionally include second content of the non-default content type;

receive first data responsive to the natural language command, the first data corresponding to the default content type;

receive second data responsive to the natural language command, the second data corresponding to the non-default content type; and based at least in part on the first data and the second data, cause the output to include at least the first content of the default content type and the second content of the non-default content type.

11. The system of claim 10, wherein the at least one memory further comprises instructions that, when executed by the at least one processor, further cause the system to:

determine a category of the natural language command; and determine that the output is to additionally include the second content of the non-default content type based at least in part on the category.

12. The system of claim 11, wherein the at least one memory further comprises instructions that, when executed by the at least one processor, further cause the system to:

determine a geographic location corresponding to the input data; and determine that the output is to additionally include the second content of the non-default content type based at least in part on the geographic location.

13. The system of claim 10, wherein the at least one memory further comprises instructions that, when executed by the at least one processor, further cause the system to:

determine a first skill corresponding to the non-default content type;

determine a first component corresponding to the first skill; and receive the first data from the first component.

14. The system of claim 13, wherein determination of the first skill is based at least in part on the profile.

15. The system of claim 14, wherein the at least one memory further comprises instructions that, when executed by the at least one processor, further cause the system to:

determine a second component, different from the first component, corresponding to the default content type; and receive the second data from the second component.

16. The system of claim 11, wherein the first data and the second data correspond to a same domain of a natural language processing system.

17. The system of claim 11, wherein the at least one memory further comprises instructions that, when executed by the at least one processor, further cause the system to:

generate an output data format including a first slot to be populated with the first content and a second slot to be populated with the second content;

configure output data corresponding to the output data format, the output data including the first data in the first slot and the second data in the second slot; and cause the output to include the first content and the second content based at least in part on the output data.

18. The system of claim 17, wherein generation of the output data format is based at least in part on the profile.

* * * * *